United States Patent [19]
Mehnert et al.

[11] Patent Number: 5,323,109
[45] Date of Patent: Jun. 21, 1994

[54] INDUCTIVE POSITION INDICATOR FOR MONITORING THE RELATIVE POSITIONS OF TWO MUTUALLY MOVABLE BODIES

[75] Inventors: Walter Mehnert, Grillparzer Strasse 6, 8012 Ottobrunn, Fed. Rep. of Germany; Thomas Theil, Feldafing, Fed. Rep. of Germany

[73] Assignee: Walter Mehnert, Ottobrunn, Fed. Rep. of Germany

[21] Appl. No.: 872,459

[22] Filed: Apr. 23, 1992

[30] Foreign Application Priority Data

Apr. 26, 1991 [DE] Fed. Rep. of Germany ....... 4113745

[51] Int. Cl.$^5$ .......................... G01B 7/14; G01B 7/30
[52] U.S. Cl. .................... 324/207.17; 324/207.22
[58] Field of Search .............. 324/202, 207.16–207.19, 324/207.22–207.25, 225, 239, 243

[56] References Cited

U.S. PATENT DOCUMENTS

| | | | |
|---|---|---|---|
| 2,964,716 | 12/1960 | Berman | 324/207.17 UX |
| 3,045,227 | 7/1962 | Minas | 324/207.17 UX |
| 3,732,553 | 5/1973 | Hardway, Jr. | 324/662 UX |
| 3,786,459 | 1/1974 | Berger | 324/207.17 X |
| 4,013,911 | 3/1977 | Fujiwara et al. | 324/207.17 X |
| 4,695,795 | 9/1987 | Nakamizo et al. | 324/207.25 X |
| 4,878,020 | 10/1989 | Kärnä et al. | 324/207.17 |
| 5,107,212 | 4/1992 | Dobler et al. | 324/207.22 X |

FOREIGN PATENT DOCUMENTS

| | | |
|---|---|---|
| 210927 | 2/1987 | European Pat. Off. |
| 2449697 | 11/1979 | Fed. Rep. of Germany |
| 2278141 | 2/1976 | France |
| WO90/04152 | 4/1990 | PCT Int'l Appl. |

Primary Examiner—Gerard R. Strecker
Assistant Examiner—Warren S. Edmonds
Attorney, Agent, or Firm—Sughrue, Mion, Zinn, Macpeak & Seas

[57] ABSTRACT

An inductive position indicator has an exciter coil for generating a magnetic flux, a measurement coil arrangement, and a flux guide of ferromagnetic material which provides for the magnetic flux a closed measurement path which includes at least one gap, in the region of which the measurement coil arrangement is so positioned that the magnetic flux passing therethrough changes in dependence on the position to be monitored. To improve the fidelity of the characteristic and enhance measurement accuracy, the flux guide provides at least one further closed compensating path which carries the magnetic flux passing therethrough, past the magnetic coil arrangement. When there are two mutually adjacent measurement coils through the surfaces of which the measurement flux can pass in a variable fashion and the output signal difference of which is included in the position signal, the surfaces enclosed by the measurement coils have at least one common edge portion over which the measurement flux can move.

41 Claims, 4 Drawing Sheets

INDUCTIVE POSITION INDICATOR FOR MONITORING THE RELATIVE POSITIONS OF TWO MUTUALLY MOVABLE BODIES

BACKGROUND OF THE INVENTION

The invention relates to an inductive position indicator or sensor for monitoring the relative positions of two mutually movable bodies.

Position indicators or sensors of that kind serve to produce an electrical signal, by means of which it is possible to monitor or trace and measure a continuous or intermittently occurring relative movement between two bodies, in such a way that, at any moment in time, information is available about the instantaneous position of one of the two bodies relative to the other.

Such an indicator may be a linear indicator or sensor in which for example the movement and/or instantaneous position of a machine carriage which is displaceable relative to a machine frame structure is to be detected and controlled, with a high degree of precision. That situation requires the constant production of a signal which provides information about the instantaneous position of the carriage, even when the carriage is moving at a high speed.

Another form of indicator is a rotary indicator or sensor for measuring the instantaneous angular position of a rotating body, for example the rotor of an electric motor relative to the stator, or the rotary angle between two bodies which are rotatable relative to each other, for example the azimuth or vertical angle of the telescope of a theodolite.

In a similar fashion, a rotary indicator or sensor can be used to measure the angular positions or speeds of rotation of motor vehicle wheels or the instantaneous angular position of a carburettor butterfly valve.

A linear position indicator can be found in German patent specification No. 25 11 683. That indicator has ferromagnetic flux guide means including two rectangular elongate flat plates arranged parallel to each other in such a way that, between their flat sides, they have an air gap. At one of the two short sides of the rectangular configuration, those plates are connected by a limb portion which extends perpendicularly to the planes of the plates, in such a way as to provide a U-shaped longitudinal section. The limb portion extends through an exciter coil which is fed with alternating current to generate a magnetic flux which can follow an annularly closed path, across the air gap, with a substantially homogeneous magnetic field being produced in the air gap.

That flux guide means is connected to one of the two mutually movable bodies while coupled to the other body is a measurement coil arrangement which is in the form of a printed circuit and which has two measurement coils of which each includes a plurality of windings each embracing a respective surface element.

The surface elements which are formed in that way are of different sizes and arranged in interleaved relationship with each other. All in all, that arrangement is of an elongated measurement coil configuration which extends in the direction of the movement to be monitored, and defines the maximum width thereof. The carrierboard of the measurement coils is disposed between the two plates of the flux guide means and parallel to said plates. The two mutually oppositely disposed wall surfaces of the air gap formed between the plates of the flux guide means concentrate the magnetic flux which crosses over between them, on to a substantially parallelepipedic spatial region which intersects the surface of the measurement coil carrierboard and thus the measurement coil at a substantially rectangular transit surface, the longitudinal direction of which extends perpendicularly to the direction of movement transversely across the entire measurement coil arrangement, and the width of which, in the direction of movement, is substantially shorter than the maximum width of movement. If one of the two bodies to be monitored moves relative to the other body, then the transit surface is displaced over the surface elements of the measurement coil arrangement, whereby the magnetic flux passing through the individual windings changes so that the measurement coils respectively produce an electrical output signal of variable amplitude. The output ac voltage signals produced by the measurement coils are rectified so as to give variable dc voltage signals, the respective magnitude of which is characteristic of the instantaneous position occupied by one of the two bodies with respect to the other. In order to suppress interference influences and to produce an output signal which is symmetrical relative to the zero potential associated with the central position, the two measurement coils are of such a configuration and/so arranged in mirror image relationship with each other that regions of the transit surface which, upon movement of the two bodies, leave the condition of overlap with the one measurement coil, pass into a condition of overlap with the other measurement coil and vice-versa; in that situation, the difference signal from the output signals of the two measurement coils is to follow a linear configuration as accurately as possible, over as large a part as possible of the range of the movement to be monitored. In the case of configurations in which another output signal characteristic is predetermined, it is desirable in a corresponding fashion for the characteristic which is theoretically predetermined by the selected configuration to be maintained as accurately as possible over the entire range of movement.

That requirement is only met to an inadequate degree, by the state of the art. Thus for example it can be readily seen from German patent specification No. 25 11 683 that the linear configuration of the output signal characteristic, which that arrangement seeks to achieve, terminates not in a sharp point but in a rounded point, when approaching the two limit positions. It is also found in practice that the characteristic of such an arrangement also extends not linearly but distorted in a S-shaped form, in the region of the passage through zero. Admittedly, such non-linearities can be partially compensated by means of the electronic circuitry disposed on the output side of the indicator. However that involves additional structure and thus increased costs.

SUMMARY OF THE INVENTION

An object of the invention is to provide a position indicator which affords greater accuracy in operation by reducing any deviation of its output signal characteristics from its theoretical configuration.

Another object of the present invention is that of developing an inductive position indicator which is of a structure of the utmost simplicity and low cost but which can produce a direct output signal that follows the structurally-determined characteristic configuration, with the greatest possible degree of accuracy, over as much of the range of movement as possible.

That object is attained by a positive indicator according to the invention set forth herein.

The invention is based on the realisation that a part of the difficulties which arise in regard to measurement accuracy and resolution capability of an inductive position indicator because the output signal characteristic which is actually achieved departs from the theoretically predetermined configuration, is to be attributed to the fact that both leakage components of the magnetic flux generated by an exciter coil of the indicator and also field non-homogeneities, in particular in the edge regions of the transit surface as mentioned above, act in different ways on the measurement coil arrangement, depending on the movement to be monitored.

It was found that such interference effects can be reduced in accordance with the invention by the design of the inductive position indicator which provides a maximum, undisturbed and homogeneous magnetic flux passing through the measurement coil arrangement. A first step in that direction is represented by the integer that at least two annularly closed paths are presented to the magnetic flux generated by the exciter coil (it will be noted here that the word annularly in the expression annularly closed is not necessarily used herein in a strict narrow sense of a circular ring), one of said paths serving as a measurement path, that is to say, passing the useful or effective magnetix flux employed to produce the measurement signal across the gap which defines the transit surface and in the region of which is positioned the at least one surface element of the measurement coil arrangement, while at least one further annularly closed path serves as a compensating path and carries as large a part as possible of the remaining magnetic flux coming from the exciter coil, in such a way that it can exert at least no influence which is dependent on movement or position, on said at least one surface element.

By virtue of the configuration of the flux guide means according to the invention, it is possible for the leakage fields which are present outside the annularly closed paths not only to be greatly reduced and homogenised in comparison with the state of the art, but also to be of such a configuration that their influence on the measurement coil arrangement—insofar as it still exists at all—only undergoes minimum variation in dependence on the movement to be monitored. That provides that the actual characteristic configuration follows the curve which is theoretically predetermined by the selected configuration, with a substantially greater degree of accuracy than is the case with the known inductive position indicators.

The at least two annularly closed paths which are provided in accordance with the invention do not have to be completely separated from each other. In most cases, measurement and compensating paths extend in several of or even most of their portions through the same regions of the flux guide means. It is sufficient if each thereof has a portion which does not belong to one of the other paths, wherein said one portion of each measurement path includes the gap which defines the associated transit surface and in the region of which is arranged at least one surface element of the measurement coil arrangement, while the corresponding portion of each compensating path precisely guides its magnetic flux past all said surface elements.

A particularly substantial reduction in the interference influences is achieved by providing for a degree of symmetry, which is as high as possible, by the at least two available annularly closed paths.

Depending on the respective specific configuration involved, for example in the form of a rotary indicator or a linear indicator, that maximum symmetry includes one, more or all of the following aspects: the measurement and compensating path or paths may be of substantially the same or at least similar geometrical configuration and/or may have the same magnetic flux density in as many portions as possible. In particular both kinds of annularly closed paths may have the same reluctance. Preferably, that is achieved by the compensating path also including a gap, the reluctance of which is approximately equal to the reluctance of the gap in the measurement path.

In principle, the gap in the compensating path may also be used to produce a measurement signal. In the case of a rotary indicator, it is then not possible to set extreme levels of requirement in regard to the degree of measuring accuracy. For that purpose, arranged in the region of that gap is a further measurement coil which either has its own output terminals or which is electrically conductively connected to the measurement coil which is disposed in the region of the gap of the actual measurement path. In both cases, it is provided that the voltages generated in the two measurement coils are added so as to give a greater signal difference between minimum and maximum output signals.

The concept according to the invention of at least two annularly closed, magnetically symmetrical paths for the magnetic flux generated by the exciter coil may be used in relation to two fundamentally different kinds of inductive position indicators:

In the one alternative configuration, the exciter coil, the core of the exciter coil and the measurement coil arrangement are fixedly connected to one of the two mutually movable bodies, at least in the direction of the movement to be monitored, and preferably completely. In that case, besides the core, the flux guide means also includes a yoke which is separated from the core by at least one gap so that it can move relative thereto. That yoke which serves for closing in an annular configuration the at least two paths for the magnetic flux is connected to the other of the two mutually movable bodies. Of the three gaps preferably provided between it and the core, one gap is disposed in one of the two annularly closed paths while another is disposed in the other of the two annularly closed paths, and the third is disposed in the same manner in both paths and is provided only for reasons of mobility of the yoke relative to the core.

At least in the region of the gap provided in the measurement path, a measurement coil arrangement is positioned in the above-described manner as is required for the generation of a measurement signal.

An advantage of this first alternative configuration is that the core can serve simultaneously as a mechanical mounting for the exciter coil and the measurement coil arrangement as all those members are connected to one and the same of the two mutually movable bodies. Furthermore, a consideration of particular importance is that the measurement and compensating paths are strictly separated from each other.

In a second alternative configuration, at least the measurement coil arrangement and preferably also the exciter coil are connected to one of the two mutually movable bodies while the flux guide means forms a unitary body which is fixedly connected to the other of the two mutually movable bodies. The flux guide means, for production and assembly reasons, may admittedly comprise a plurality of parts, but they are fixedly connected together in the assembled condition and, by virtue of the movement to be monitored, are displaced jointly relative to the measurement coil arrangement, for which in this case a configuration in the form of a printed circuit is particularly advantageous. The board or plate member required for that purpose can then serve at the same time as a carrier for the exciter coil which is preferably also in the form of a printed circuit.

This second alternative configuration requires only the two gaps which are arranged in the at least two annularly closed paths. As each gap represents a reluctance, saving one gap results in a greater magnetic flux so that, with the same input power, a greater output signal amplitude is produced. The overall reluctance in relation to the useful or effective flux is thus less so that the useful/leakage flux ratio is more advantageous. Furthermore, the two gaps which are also provided in this construction are formed in the body, which moves as a unit, of the flux guide means, so that the shape and in particular the width thereof are completely independent of the movement to be monitored, In the case of the first alternative configuration, that can only be achieved if the mutually movable parts of the flux guide means are suitably mounted and guided, which is comparatively expensive. As in this case the central part of the flux guide means, through which the exciter coil passes, does not have any air gap, it keeps external interference phenomena away from the measurement coils. That arrangement also provides for optimum symmetry between the measurement and compensating paths.

If the surface elements of the measurement coil arrangement, through which the magnetic flux is to pass, are of a suitable configuration and dimensions, it is possible to provide that eccentricities and/or mounting clearance effects which occur with 'standardised' mounting means, as between the flux guide means and the measurement coil arrangement, have only an immaterial influence on the measurement signal. Therefore, in the second alternative configuration, the requirements that have to be set in regard to mounting of the mutually movable members of the inductive position indicator are considerably lower.

An advantage of both alternative configurations is that the measurement coil arrangement and the exciter coil can always be jointly connected to that one of the two mutually movable bodies, which in the respective situation of use is to be considered as stationary, that is to say, it does not move relative to the actuating and evaluation electronic systems. Only the yoke or the entire flux guide means is secured to the other body which moves relative to the electronic systems; however the yoke or the flux guide means do not require any electrical connecting lines so that there is no need for coupling means which are required in rotary indicators which are known in the state of the art and in which the exciter coil is connected to one of the two mutually movable bodies and the measurement coil arrangement is connected to the other of the two movable bodies.

In both alternative configurations, the shape and the relative arrangement both of the wall surfaces which define the gaps and thus the transit surfaces and also the surface elements of the measurement coil arrangement can be varied within wide limits and adapted in the optimum fashion to the respective circumstances of use.

In that respect, it is possible in particular to predetermine in very different ways the configuration assumed by the measurement coil output signal or the dc voltage signal derived therefrom by demodulation, when the two bodies to be monitored perform a given relative movement. It is thus possible to provide for example that, in regard to one and the same movement as between the two bodies to be monitored, the demodulated output signal passes through a sine period, a plurality of sine periods, a linear rise, a linear rise and a corresponding linear fall, a plurality of such symmetrical or asymmetrical triangular curves, or any parts of such curves.

If, upon a relative movement of the two bodies over a substantial distance or a substantial angle, the output signal is of the same curve configuration on a number of occasions in a periodic fashion, that admittedly gives rise to an uncertainty in regard to the position of one of the two bodies relative to each other, but in many situations of use that uncertainty does not cause problems. If for example a rotary indicator is used to produce a given control signal after a rotary angle of 90° in each case, then, that angle of 90° must be ascertained with a very high degree of resolution, as is possible by means of the arrangement according to the invention; however the absolute angle, that is to say which of the four successive 90° segments is just being transited, is of no significance.

By virtue of the feature that at least two annularly closed paths are provided for the magnetic flux generated by the exciter coil and at least one of those paths is used for the production of a measurement signal, the leakage fields can be greatly reduced, with the remainder being substantially homogenised. However, certain field non-homogeneity phenomena will always occur in the edge regions of the gap with which is associated the at least one surface element which is covered to a variable degree by the transit surface defined by the walls of the gap, but the influence of such field non-homogeneity phenomena on the measurement result can be eliminated or greatly reduced by the following steps: firstly, it is advantageous if the at least one surface element and the transit surface are of the same form and are so arranged that their edge lines extent substantially parallel to each other. In a particularly preferred embodiment the at least one surface element and the transit surface are substantially four-sided and are so arranged that one pair of edge lines of both the surface element and the transit surface extends substantially parallel to the direction in which the transit surface is displaced relative to the surface element while the respective second pair of edge lines extends substantially perpendicularly to said direction.

Then, preferably, for the at least one surface element, the first-mentioned pair of edge lines involves a clearly smaller spacing or, and this is particularly advantageous, a clearly greater spacing, than the associated pair of edge lines of the transit surface.

In the former case, the respective edges of the surface element are in the homogeneity region of the magnetic flux which crosses over in the gap and the non-homogeneous components of which do thus not pass through the surface element and therefore can also make no contribution to the measurement signal and its variations. It will be appreciated that a necessary condition in that respect is that the means mounting and guiding the yoke and the entire flux guide means respectively, with respect to the measurement coil arrangement, are of such precision that fluctuating movements which occur transversely to the direction of displacement are so small that the side edges of the surface element never leave the homogeneity region of the magnetic flux.

That limitation does not occur in the second case, because in that case the respective measurements of the surface element can be so large, relative to the transit surface, that the non-homogeneous magnetic field components, insofar as they are still capable of having any influence at all on the measurement signal by virtue of their strength which decreases exponentially outwardly, remain within the surface element even when fluctuation movements occur transversely to the direction of displacement, with mounting and guide means of a lower standard.

Somewhat different considerations apply in regard to the edge lines of the at least one surface element and the transit surface, which extend perpendicularly to the direction of displacement: in this case, one possibility is that the at least one surface element and the transit surface are arranged in mutually displaced relationship in the direction of movement, and are of such a size that, in all positions which the two bodies to be monitored can assume relative to each other, the one edge line of the transit surface, which extends transversely to the direction of displacement, always remains outside the at least one surface element, while the oppositely disposed edge line of the transit surface always moves within said surface element, while in addition the degree of movement which actually occurs is to be limited in such a way that the transversely extending edge lines of the transit surface never approach the associated edge lines of the surface element to such a degree that the field non-homogeneities which are present at those gap edges can play a part. The one transversely extending edge line of the at least one surface element is in this case therefore always disposed in the homogeneity region of the magnetic flux which crosses over in the gap while the 'oppositely disposed' edge line of the surface element always remains so far outside the gap that all non-homogeneous field components which are of reasonably relevant strength are also included in any possible position of the two bodies. That of course means that the arrangement must be considerably greater in the direction of movement than the degree of movement which can be used at a maximum.

In the case of rotary indicators which are to monitor angles of 360° or more, the above-indicated condition does not have to be maintained. Therefore, in this case, as also in all cases where the length of the arrangement is to be as short as possible in the direction of movement, the dimensions of the at least one surface element and the transit surface in the direction of displacement are selected to be the same. A reduction in the influence that leakage fields and non-homogeneities can exert at the edges, which extend transversely to the direction of movement, of the transit surface and the surface element respectively, is achieved in this case by virtue of the fact that the conductor portion or portions of the measurement coil, which define the at least one surface element at said edges, are completely embedded in ferromagnetic material.

That arrangement provides for a defined flux division, that is to say, whether, in a given position, a field line does or does not pass through the surface element of the measurement coil depends simply and solely on the position adopted by the conductor which here defines the surface element, relative to the transit surface, but not on the materials of the surroundings. In that way the degree of fidelity of the characteristic can be further improved.

The use of a conductor environment which is homogenised in such a way that it is completely filled with ferromagnetic material is advantageous in particular because it results in optimum homogenisation of the magnetic flux used for measurement purposes. In addition, it is possible to achieve a smaller air gap which has a lower level of reluctance, and that results in a greater magnetic flux and a better coupling effect, so that a higher output signal is produced with the same input power. The leakage effects are reduced and the ratio of useful flux to leakage flux is better.

The reasons for that lie on the one hand in the fact that the 'homogenised' leakage fields exert a smaller influence, because the reluctance for the useful flux is lower, and on the other hand, because the edge effects involve a smaller local extent.

In addition, the antenna effect of the measurement coil arrangement is reduced both in regard to the emission and also the reception of interference signals.

A particularly low level of reluctance can be achieved, in regard to the annularly closed path associated with the at least one surface element, if there is provided a filling body of ferromagnetic material which is arranged between the mutually oppositely disposed wall surfaces of the gap and which substantially bridges over the internal width thereof. That filling body is fixedly connected to the measurement coil arrangement and as extensively as possible covers over the surface of the at least one surface element. In the alternative configuration in which the core is fixedly connected to the measurement coil arrangement, that filling body may be an integral component of the core which projects through the measurement coil winding or windings in the direction of the yoke. In the other alternative configuration, the filling body is completely separated from the flux guide means as the latter must move as a whole relative to the measurement coil arrangement and the filling body which is fixedly connected thereto. In that case the filling body can be held by the carrier plate or board member of the measurement coil arrangement.

In principle the mutually oppositely disposed surfaces of the filling body and yoke or the filling body and the flux guide means respectively may touch each other. The electromagnetic function of the inductive position indicator is then at its optimum. A certain distance, which is as small as possible, between those mutually movable surfaces, is possibly desirable for mechanical reasons, in particular to avoid abrasion or frictional and braking effects.

The foregoing considerations apply irrespective of the number of surface elements which the measurement coil arrangement has, and therefore in particular even when there is only a single such surface element.

Now however, the state of the art, for example German patent specification No. 25 11 683, discloses difference arrangements in which there are a plurality of surface elements, for example two thereof, each of which is enclosed by its own measurement coil winding which in the simplest case comprises a single turn, between the two open ends of which an ac voltage signal can be tapped off. In an embodiment set forth in the above-identified publication, the two surface elements are in the form of rectangular triangles and are so arranged one beside the other in one plane that they supplement each other to form an elongated rectangle, the long sides of which extend parallel to the direction of displacement of the transit surface which is defined by the walls of the gap of the flux guide means. That transit surface is also in the form of a rectangle, the extend of which in the direction of displacement is small in comparison with the length of the maximum length of displacement and which, perpendicularly to the direction of displacement, is somewhat greater than the rectangle formed by the two triangular surface elements, and constantly covers the rectangle over. The conductor portions of the two turns which form the hypotenuses of the two triangles extend in mutually parallel relationship at a predetermined spacing and inclinedly relative to the direction of displacement of the transit surface in such a way that, upon displacement thereof, that part of the magnetic flux which crosses over in the gap, that passes through the one surface element, increases to the extent that the part passing through the other surface element decreases, and vice-versa. The two measurement coil signals which are obtained in that way are subtracted from each other after rectification so as to give a substantially linear signal which is symmetrical relative to the zero potential and which is liberated of a part of the possible interference influences and which is representative of the instantaneous position of the two bodies to be monitored.

By virtue of a different configuration and arrangement of the surface elements and/or the transit surface, it is also possible to provide configurations other than a linear configuration, for such a difference signal, as has already been discussed above in relation to the general situation involving any number of surface elements.

In regard to all those difference signals, it is found that their actual configuration departs from the configuration which is theoretically predetermined by the selected construction, that is to say for example from the desired linearity, at least in certain parts of the range of movement to be monitored, and thus undesirably restricts the degree of measurement accuracy and/or the resolution capability.

In order to achieve a further improvement in this respect, that is to say, in order to produce an even greater, undisturbed, homogeneous useful or effective flux, in accordance with the invention it is provided that the at least two surface elements have a common edge portion, over which the transit surface can move by virtue of the movement to be monitored.

That arrangement is based on the following realisation: if, as is the case in the state of the art, two mutually adjacent surface elements are separated by the use of two juxtaposed edge portions which are disposed at a spacing in the direction of displacement of the transit surface and which are each defined by a conductor portion of the associated measurement coil winding, then between those edges there always remains a surface region which does not belong to either one or the other of the surface elements. The magnetic flux which passes through that surface region, while the transit surface is displaced over the two surface elements, does not contribute to producing a measurement signal either in the measurement coil which embraces the one surface element or in the measurement coil which embraces the other surface element. When the influence of interference fields cannot be completely eliminated by the difference-forming operation, that results in an error whose relative magnitude increases, in proportion to an increasing ratio in respect to the surface region which is not used, to the transit surface area which is being used.

In addition, the result of the surface region which is between the surface elements is that very high levels of requirement in regard to parallelism must be made in relation to the two edge conductors which extend at a spacing from each other. More specifically, if the spacing of those two conductors, over their lengths, alters either in a constantly increasing or decreasing fashion or in an alternating fashion, then the component of the magnetic flux in the gap, which is lost between the surface elements which are enclosed by the measurement coil windings, is also dependent on position. Accordingly, the remaining magnetic flux which passes through one measurement coil or the other receives an additional positional-dependent component which results in a deviation between the practical configuration and the theoretical configuration of the output characteristic.

A further problem arises in the state of the art because of the field non-homogeneities which are always inevitably present at the edges of the gap or the transit surface defined by the gap. If such an edge approaches the boundary zone of mutually adjacent surface elements, then, in the state of the art, field regions which pass out of a condition of overlap with the one surface element have a higher level of magnetic flux density than the field regions which at the same time pass into a condition of overlap with the adjacent surface element, and vice-versa, and that gives rise to major errors.

In comparison therewith, the common edge, which is provided in accordance with the invention, between the mutually adjacent surface elements, ensures that each field line which leaves the condition of overlap with the one surface element necessarily passes into a condition of overlap with the adjacent surface element, and vice-versa. Furthermore, that arrangement provides that the movement which must be covered before the edge that separates the two surface elements from each other, after passing into noticeable non-homogeneous field regions, reaches the homogeneous field region in the interior of the gap or a practically field-free region outside the gap, is reduced to an absolute minimum. As a result of that, the arrangement provides a greatly improved approximation of the actual characteristic configuration, to the 'constructional characteristic'.

The common edge between two adjacent surface elements may also be achieved if the two surface elements, at least in that edge region, do not lie exactly in the same surface but, as viewed in the direction of the magnetic flux passing through the gap, are arranged one behind the other at a spacing which is as small as possible, so that they coincide with each other. However, that requires the measurement coil arrangement to be of a somewhat more expensive structure; for example, when the measurement coils are in the form of printed circuits, a plate or board member which is coated on both sides must be used. It is also necessary to provide that the two conductor portions which are disposed one behind the other and which define the common edge are arranged symmetrically relative to the center of the gap in respect of height, in order to reduce the influence of field non-homogeneities to an absolute minimum.

In order to avoid that expenditure, to which there is also added precise positioning of the two conductors which are to be arranged one behind the other, it is therefore provided in a particularly preferred embodiment that the common edge portion is formed by a conductor portion which is common to the two measurement coil windings which embrace the two surface elements. It is also desirable for said common conductor portion to be arranged to extend as perpendicularly as possible to the direction of displacement of the transit surface, and for it to be as short as possible. If the measurement coil arrangement is in the form of a printed circuit, that provides a particularly simple plate or board configuration as the two mutually adjacent surface elements can be arranged on the same side of the plate or board member. The configuration of the common conductor portion is determined by a single mask so that, in regard to the effectiveness of the field division effect produced thereby, the accuracy with which otherwise two masks which are required to produce double-sided printed circuits would have to be positioned relative to each other no longer plays any part.

A particularly simple design configuration for a measurement coil arrangement with two surface elements which are each embraced by a respective measurement coil turn can be achieved if two conductor portions of which one defines the one surface element and the other defines the other surface element along a respective edge which extends substantially parallel to the direction of displacement of the transit surface relative to the respective surface element, are connected together at their two ends to form an annularly closed conductor. In that case that annularly closed conductor must have an electrical resistance which does not represent a short-circuit. That is required in order not to cause excessive loading of the signal source and to limit the current in the closed conductor.

With such an arrangement, the two output signals can be tapped off from two measurement coils by way of three output terminals of which one leads to the closed conductor which is common to the two measurement coils. That arrangement is particularly advantageous in relation to rotary indicators. It results in a particularly high degree of measuring accuracy if the annularly closed conductor is so arranged that, in any desired position of the mutually movable bodies, both the magnetic flux passing through the exciter coil and at least also the magnetic flux passing through the compensating path passes through the surface enclosed by the conductor. In that way, the output signal of each of the two measurement coils is produced by integration over by far the major part of the magnetic flux which occurs in the arrangement. In that respect, almost all interference parameters are also involved in the same manner in each of the two output signals so that they cancel each other out in the subsequent difference forming operation. Moreover, only an annularly closed conductor permits a single conductor limb to be used for dividing up the magnetic flux when dealing with measurement angles of 360° or more, in order to achieve the highest degree of accuracy.

If, as is appropriate in certain situations of use, the measurement coil arrangement comprises a plurality of surface elements which are arranged in mutually displaced relationship in the direction of movement and the output signals of which are successively evaluated in the course of the movement to be monitored or are used with a weighting effect which changes in the course of the movement, to form a measurement signal, then such a closed conductor affords the advantage that it can be jointly used for all such measurement coil sub-systems and only has output terminals which are taken out at different locations, for those various sub-systems.

Further objects, features and advantages of the invention will be apparent from the following description of preferred embodiments.

DESCRIPTION OF PREFERRED EMBODIMENTS

Figure 1:
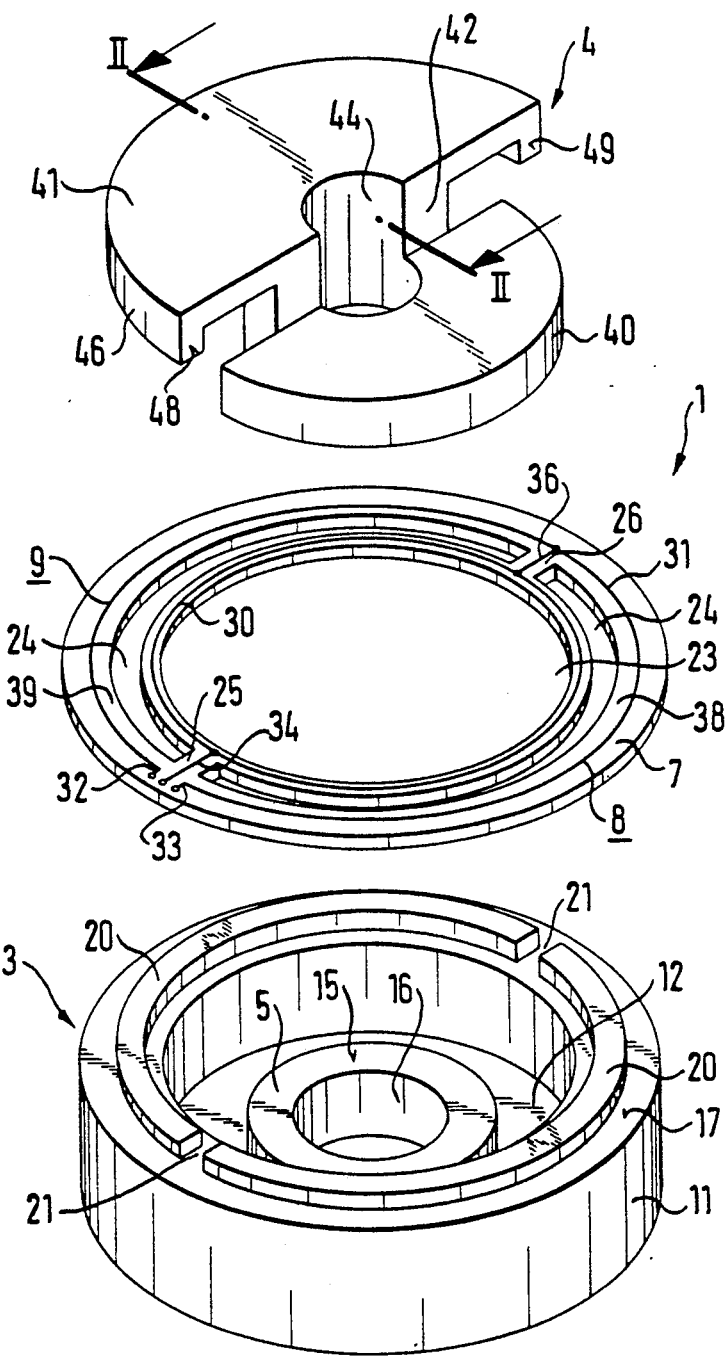
FIG. 1 is an exploded view of a rotary indicator in which the core of the flux guide means is non-rotatably connected to the exciter and measurement coil arrangement while the yoke rotates relative to the core and the measurement coil arrangement.
Figure 2:
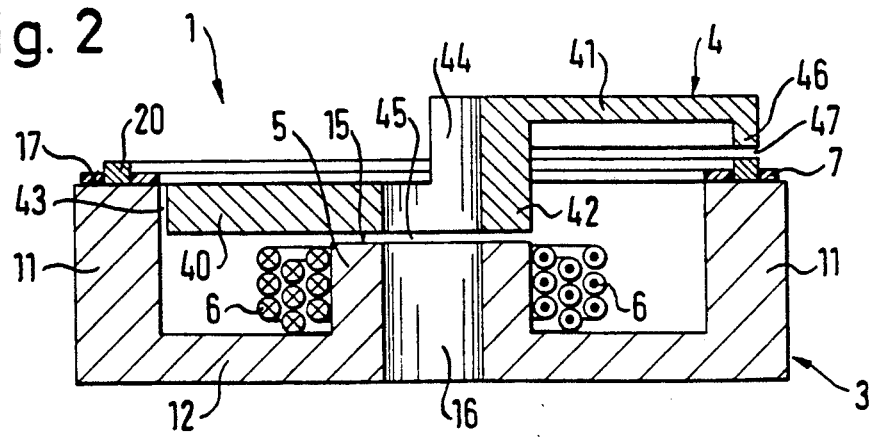
FIG. 2 is a view in section taken along line II—II through the assembled rotary indicator shown in FIG. 1.

The rotary indicator or sensor 1 shown in FIGS. 1 and 2 includes a flux guide means of ferromagnetic material, which comprises a core 3 in the form of a pot or cup and a yoke 4, an exciter coil 6 (which is omitted in FIG. 1) wound around a projection 5 of the core 3, and a carrier plate or board member 7 on the one flat side of which are provided two measurement coils 8, 9 in the form of printed circuits.

The core 3 is a hollow circular cylinder with a cylinder wall 11 which is integrally connected to a bottom 12. Extending from the inside of the bottom 12 is the projection 5 which is also formed integrally thereon and which is in the form of a circular cylinder and is arranged concentrically with respect to the cylinder wall 11, over a height such that the distance of its end face 15, which is at the top in FIGS. 1 and 2, from the plane defined by the end face 17 of the cylinder wall 11, is somewhat greater than the axial thickness of the lower semicircular disk 40, which is described in greater detail hereinafter, of the yoke 4. A central through bore 16 passes through the projection 5 and the bottom 12 and can serve to accommodate a shaft (not shown).

Provided on the end face 17 of the cylinder wall 11 is an annular, concentrically arranged rib 20 which projects upwardly in the Figures and which is of a substantially square cross-section and which extends substantially centrally between inner and outer peripheral edges of the end face 17. At two locations which are displaced through 180° relative to each other, the rib 20 is interrupted by two openings 21 which extend as far as the end face 17.

The carrier plate member 7 is in the form of a circular ring, the diameter of its central opening 23 being equal to or somewhat greater than the inside diameter and its outside diameter being somewhat smaller than the outside diameter of the cylindrical wall 11. In addition the carrier plate member 7 has two part-annular openings 24, 24 which extend therethrough and which are arranged concentrically in such a way that they almost supplement each other to constitute an annular opening which is interrupted only at two mutually oppositely disposed locations by narrow connecting web portions 25 and 26. The openings 24, 24 and the connecting web portions 25 and 26 are so arranged and dimensioned that the carrier plate member 7 can be fitted on to the end face 17, in which case the two parts of the rib 20 extend through the openings 24 and the connecting web portions 25 and 26 extend in the openings 21. In that way the carrier plate member 7 is non-rotatably connected to the core 3.

The measurement coils 8, 9 which are disposed on the side of the carrier plate member 7 which is upward in FIGS. 1 and 2 include two circular, concentrically arranged conductors 30 and 31 of which the inner is disposed within the openings 24, 24 and the outer is disposed outside the openings 24, 24. The inner conductor 30 is completely closed while the outer conductor 31 has a small interruption at which its ends are connected to two connecting conductors 32, 33 which extend substantially radially and in mutually parallel relationship outwardly. A radially extending connecting conductor 34 for the inner conductor 30 extends over the connecting web portion 25 between the two connecting conductors 32, 33 for the outer conductor 31, and parallel to the connecting conductors 32, 33. Extending over the diametrally oppositely disposed connecting web portion 26 is a radially extending connecting conductor 36 which electrically conductively connects together the conductors 30 and 31.

Accordingly the two measurement coils 28, 29, each of which comprises a single turn, enclose two semi-annular surface elements 38, 39 which are here disposed in one plane and which supplement each other to form a practically closed circular ring and which have two common edge portions which are formed by the central connecting conductor 34 and the connecting conductor 36.

The yoke 4 essentially comprises two semi-circular disks 40 and 41 which are of different radii and which are so arranged that their edges which extend along the diameter of the circle, in plan view, extend in directly juxtaposed relationship with each other, and the two circular arcs are oriented away from each other. In the axial direction, the disks 40 and 41 are disposed at a spacing from each other and are joined together by a connecting portion 42 in the form of half a circular cylinder. The radius of the semicircular disk 40 is somewhat smaller than the inside radius of the cylindrical wall 11 while the radius of the semi-cylindrical connecting portion 42 corresponds to the radius of the projection 5. The surface, which is the lower surface in the Figures, of the lower semicircular disk 40 is aligned with the lower end face of the connecting portion 42, the upper end face of which is disposed in one plane with the upper face of the upper semicircular disk 41.

Extending concentrically relative to the two semicircular disks 40, 41 and the semi-cylindrical connecting portion 42 through those components in the axial direction is a bore 44 which is of the same diameter as the bore 16 in the projection 5. In the assembled condition the yoke 4 is so arranged that the two bores 16 and 44 are aligned with each other and the lower semicircular disk 40 is so arranged within the cylindrical wall 11 of the core 3 that its surface which is upward in FIG. 2 is aligned with the end face 17 of the cylindrical wall 11.

The radius of the upper semicircular disk 41 is equal to the outside radius of the rib 20. At its side which is downward in FIGS. 1 and 2, the upper semicircular disk 41 has a downwardly projecting rib 46 which extends over the entire periphery of the semicircular disk 41 and which is of the same dimensions as the rib 20. In the assembled condition, the downwardly facing end face of the upper rib 46 and a part, of corresponding size, of the upper end face of the lower rib 20 are disposed opposite to each other at a small spacing so that those two end faces include between them a gap 47 which in actual fact can be substantially smaller than is shown in FIG. 2 for the sake of clarity. The air gap 43 between the cylindrical outside surface of the lower disk 40 and the inside surface of the cylindrical wall 11 is so selected that it gives the same reluctance as the gap 47. The air gap 45 between the underside of the disk 40 and the connecting portion 42 on the one hand and the upper end face 15 of the projection 5 on the other hand is also as small as possible.

In comparison, the free spacing between the cylindrical outside wall of the connecting portion 42 and the oppositely disposed inside surface of the cylindrical wall 11 is so great that there is a high level of reluctance here.

If now an ac voltage is fed to the exciter coil 6 by way of terminals (not shown), it generates a magnetic flux for which the described configuration of the core 3 and the yoke 4 provides two annularly closed paths which are admittedly of different geometrical configurations but which have substantially the same levels of reluctance. One of those two paths goes from the projection 5 which passes through the exciter coil 6, by way of the gap 45 into the semicylindrical connecting portion 42, through the upper semicircular disk 41, the rib 46, the gap 47, the rib 20, the cylindrical wall 11 and the bottom 12, back to the projection 5. The magnetic flux which is propagated along that measurement path always passes through at least one of the two measurement coils 8 and 9 but generally both measurement coils, with different components, the respective magnitudes of which depend on the instantaneous position of the yoke 4 with respect to the core 3.

The other annularly closed path extends from the projection 5 by way of the gap 45, through the lower semicircular disk 40, by way of the gap 43 directly into the cylindrical wall 11 and through the bottom 12 back to the projection 5. The magnetic flux in that annularly closed compensating path always remains within the planes of the measurement coils 8, 9 and cannot pass through them. As now the core and the measurement coil carrier plate member 7 are non-rotatably connected to one of the two bodies (not shown), the mutual rotary movement of which is to be monitored, while the yoke 4 is non-rotatably connected to the other of those two bodies, the rotary movement to be monitored means that the rib 46 which covers only half the periphery of a circle is displaced relative to the rib 20 which covers practically the full periphery of a circle. Between the end faces, which face towards each other, of those two ribs which form the wall surfaces of the gap 47, the magnetic flux which here crosses over between the core 3 and the yoke 4 is concentrated on to a spatial region which, like the gap 47, is approximately in the shape of half a circular cylinder. The projection of that spatial region on to the plane of the measurement coils 8 and 9 forms the transit surface which here is in the form of half a circular ring surface and the size of which is approximately equal to the downwardly facing end face of the rib 46. That transit surface is displaced relative to the two measurement coils 8 and 9 when the two bodies to be monitored are rotated relative to each other.

Two voltages can be tapped off at the output terminals 32, 33 of the two measurement coils 8 and 9, relative to the output terminal 34, the difference between those two voltages being equal to zero in the two positions in which the yoke 4 is so turned relative to the core 3 that the lower end face of the rib 46 is half opposite the part of the rib 20 which passes through the measurement coil 8 and half opposite the part of the rib 20 which passes through the measurement coil 9. In the other two positions in which the transit surface is disposed either completely above the measurement coil 8 or completely above the measurement coil 9, so that the entire magnetic flux which crosses over the gap 47 passes through one or other of those two measurement coils while no magnetic flux passes through the respective other measurement coil, the difference signal is of a minimum value or a maximum value respectively. In between, for all the positions, there is a linear rise or fall in which a part of the magnetic flux which crosses at the gap 47 passes through one of the two measurement coils 8, 9 and a part passes through the other of those two measurement coils.

Upon a full rotation of the yoke 4 through 360° relative to the core 3, that therefore produces a triangular curve configuration in which the difference signal rises linearly over 180° in order then to fall again linearly over 180°, with the minima and maxima being symmetrical relative to the zero potential of the two central positions.

The openings 21 in the rib 20 can be filled with ferromagnetic material after the carrier plate member 7 has been fitted into position so that the conductor portions 34 and 36 are almost uniformly surrounded by ferromagnetic material. In conjunction with the feature according to the invention that the two measurement coils 8 and 9 or the surface elements 38 and 39 enclosed thereby are to be so arranged that, where the transit surface defined by the gap 47 passes over the boundary thereof, they have a common edge which in this case is formed by the connecting conductor 34 and the connecting conductor 36 respectively, that configuration provides for extremely exact flux division. That means that each field line which, by virtue of a relative displacement between the core 3 and the yoke 4, no longer passes through one of the two measurement coils 8 and 9, must necessarily pass through the respective other coil. Perpendicularly to the direction of movement, the surface elements 38 and 39 are clearly larger than the mutually oppositely disposed end faces of the ribs 20 and 46, which form the wall surfaces of the gap 47, so that non-homogeneities of the magnetic field, which occur in the radial direction, have scarcely any influence on the measurement signals as all field lines which contribute to the measurement signals are always within the surface regions 38 and 39 enclosed by the measurement coils 8 and 9, in particular even when movements due to eccentricity or mounting clearance occur. Leakage field components which extend radially still further outwardly, in respect of which that no longer applies, are so weak that they are of no significance in terms of the degree of accuracy of the measurement result and the characteristic configuration.

By virtue of the fact that the entire magnetic flux generated by the exciter coil 6 is guided along two almost completely closed paths, very little interference fluxes occur. The remaining interference fluxes which occur between the semicircularly curved outside wall of the connecting portion 42 and the inside of the cylindrical wall 11 or the underside of the semicircular disk 41 and the top side of the bottom 12 are substantially homogeneous and are extremely small because of the large geometrical spacings.

When the yoke 4 turns relative to the core 3, those leakage fluxes admittedly also move, but without changing the possible ways in which they can influence the measurement coils 8 and 9. Magnetic flux lines which extend between the projection 5 and the yoke 4 across the gap 45 are either already diverted in a radial direction in the lower semicircular disk 40 or, after passing through the connecting portion 42, in the upper semicircular disk 41, without noticeable field deformation phenomena occurring in that situation at the edges, which extend along the diameter of the circle, of those two disks. Field non-homogeneities which occur at the edges of the gap 47 which are at the front or at the rear depending on the direction of movement and which are defined by the end faces 48 and 49 of the rib 46 are thus reduced to a minimum. That therefore provides a rotary indicator or sensor arrangement which outputs to the exterior very little leakage fluxes, but which conversely is also insensitive to magnetic interference phenomena coming from the outside, and supplies an output signal which in optimum fashion follows the predetermined 'constructional characteristic' configuration.

Figure 3:
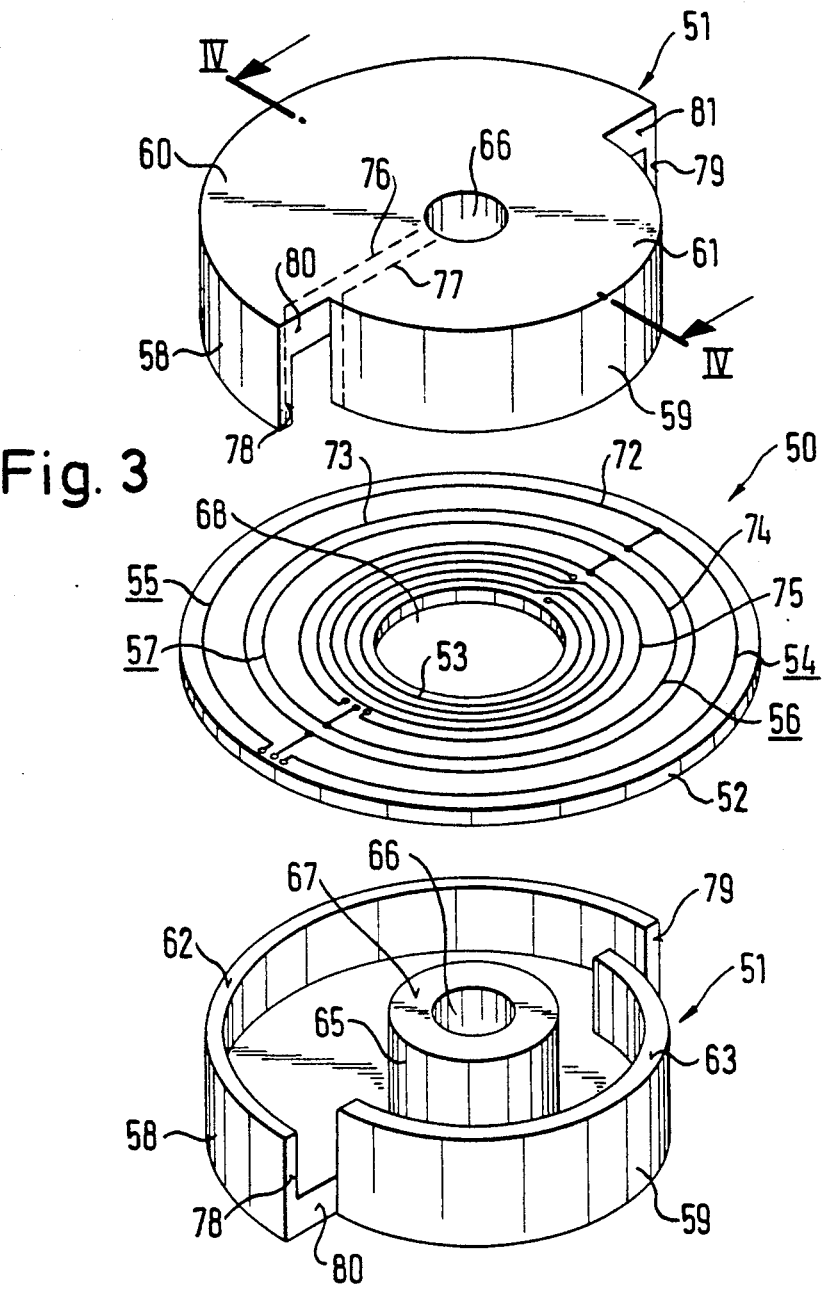
FIG. 3 is an exploded view of a rotary indicator in which the entire flux guide means rotates relative to the coil arrangement.
Figure 4:
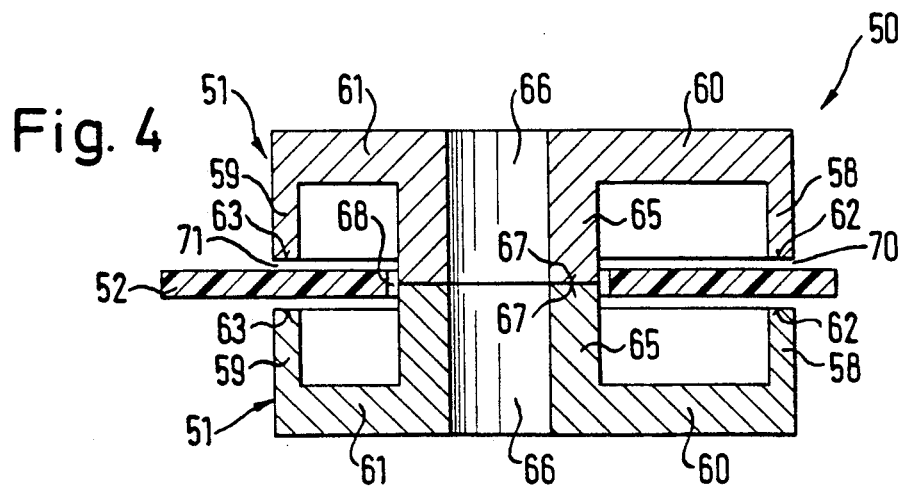
FIG. 4 is a view in section taken along line IV—IV through the assembled rotary indicator shown in FIG. 3.

The rotary indicator 50 shown in FIGS. 3 and 4 has a flux guide means which comprises two identical core shells 51, 51 and a carrier plate member 52 on which the exciter coil 53 and also four measurement coils 54, 55, 56 and 57 are disposed, in the form of printed circuits.

Each of the two core shells 51, 51 comprises two hollow semi-cylinders which are integrally connected together and which are of different radii and which are so arranged that their cylinder axes and their edges, which extend along the respective cylinder diameter, coincide, while their outwardly curved semi-cylindrical walls 58, 59 are oriented away from each other. At one end, each of the two semi-cylinders is closed by an end wall 60, 61, the shape of which precisely corresponds to its semi-cylindrical cross-section. The two end walls 60 and 61 are of the same axial thickness and integrally blend into each other. At the end which is opposite to the end walls 60 and 61, the semi-cylindrical walls 58 and 59 have free end faces 62 and 63, each of which is in the shape of half a circular ring. Extending from the end walls 60 and 61 in the same direction as the semi-cylindrical walls 58 and 59 is a centrally disposed, integrally connected projection 65, the axial height of which is greater than that of the semi-cylindrical walls 58 and 59. A concentric bore 66 extends through the projection 65 in the longitudinal direction, and can again serve to receive a shaft. In the assembled condition the two core shells 51 are fixedly connected together so that the free end faces 67, 67 of the projections 65, 65 bear against each other, with the bores 66, 66 being aligned with each other and the end faces 62, 62 and 63, 63 respectively of the semi-cylindrical walls 58, 58 and 59, 59 respectively being spaced opposite to each other and providing the gaps 70, 71 between them.

The carrier plate member 52 is in the form of a circular disk with a central opening 68, the diameter of which is somewhat larger than the outside diameter of the projections 65, 65. The outside diameter of the circular disk 58 is somewhat larger than the diameter of the two larger semi-cylindrical walls 58, 58.

As can be seen from FIG. 4, the carrier plate member 52 is so arranged that the two projections 65, 65 extend through its central opening 68 and it extends parallel to the end walls 60, 61 of the core shells 51, while it extends through the gaps 70, 71.

On its side which is upward in FIG. 3, the carrier plate member 52 has the exciter coil 53 which is of a spiral configuration and which immediately surrounds the central opening 68. Instead of that exciter coil which is in the form of a printed circuit, it is also possible for a flat coil which is wound from wire to be disposed in that region.

The four measurement coils 54 through 57 include four concentrically arranged circular conductors 72 through 75, of which respective pairs, namely the conductors 72 and 73 on the one hand and the conductors 74 and 75 on the other hand, form an arrangement comprising two measurement coils, as has already been described with reference to FIG. 1. The only modification to the measurement coils 56, 57 which are of the smaller diameter is that in their case the outer conductor 74 is completely closed while the inner conductor has the interruption which leads to the output terminals. In addition the output terminals of the measurement coils 56, 57 are oriented not radially outwardly but radially inwardly. The functional differences in such geometrically different arrangements will be described in greater detail hereinafter with reference to FIGS. 8 through 11.

The dimensions of the measurement coils 54, 55 are so selected that in the assembled condition, the magnetic flux which crosses over in the gap 70 between the end faces 62, 62 can pass through the measurement coils 54, 55, while the measurement coils 56, 57 involve the magnetic flux which crosses over in the gap 71 between the end faces 63, 63.

In operation, the carrier plate member 52 is non-rotatably connected to one of the two bodies (not shown), the rotary movement of which is to be monitored and measured, while the flux guide means formed by the two core shells 51, 51 is non-rotatably connected to the other of those two bodies. The magnetic flux generated by the exciter coil 53 is in this case also again offered two substantially symmetrical, annularly closed paths which have substantially the same reluctance. One of those two paths extends through the two projections 65, 65 by way of the two end faces 60, 60 with the greater radius, through the cylindrical walls 58, 58 and over the gap 70 which is provided between those cylindrical walls, in which case the magnetic flux following same can pass through the measurement coils 54, 55. The other of the two paths passes through the projections 65, 65 by way of the end faces 61, 61 of smaller radius, by way of the cylindrical walls 59, 59 and the gap 71, where the magnetic flux following same can pass through the measurement coils 56, 57. In that respect the measurement signals are produced in the same manner as has already been described above with reference to FIGS. 1 and 2.

The output signals generated by the measurement coils 56 and 57 can be used to obtain measurement signals of a greater amplitude. It will be noted that in the case of a rotary indicator or sensor, that is meaningful only when the requirements made in respect of the degree of measuring accuracy are not great.

In general therefore the measurement coils 56, 57 are completely omitted and instead operation is effected with a greater degree of excitation, in order to produce a greater signal amplitude. The second, annularly closed path which passes by way of the gap 71 then again serves exclusively as a compensating path in order to achieve maximum accuracy and fidelity in respect of the characteristic produced, by virtue of symmetrical division of the total flux.

In particular FIG. 4 very clearly shows that the semi-cylindrical walls 59, 59 of smaller radius form an almost closed screening arrangement, outside which only weak leakage fields occur. That means that the parts of the measurement coils 54, 55 which, by virtue of the instantaneous relative angular position, are disposed on the side of the semi-cylindrical walls 59, 59 of smaller radius and thus outside the flux guide means, are exposed to only very small leakage fluxes coming from the exciter coil 53.

Shown in relation to the upper core shell in FIG. 3, in symbolic form, are two magnetic flux lines 76, 77 which extend radially and which then bend over downwardly and which extend directly one beside the other in the radial direction in such a way that one thereof, namely the flux line 77, extends in its vertical part through the semi-cylindrical wall 59 of smaller radius, while the flux line 76 already extends through the semi-cylindrical wall 59 of larger radius. It will be seen that the two flux lines can follow those different paths, completely undisturbed. In other words: unlike the situation in the state of the art, there are scarcely any field distortion phenomena at the gap edges 78, 79 which lead or trail, depending on the respective direction of rotary movement, as almost no leakage flux lines pass along the lateral free end faces 80, 81 of the flux guide means.

The advantage of this alternative configuration relative to the embodiment shown in FIGS. 1 and 2 lies in the high degree of symmetry and the fact that the part of the flux guide means which passes through the exciter coil and which is formed by the two projections does not have any air gap. Due to the latter consideration, extraneous fields, because of the low level of reluctance, are always passed through the projections 65, 65 and are thus kept away from the measurement coil arrangement.

Figure 5:
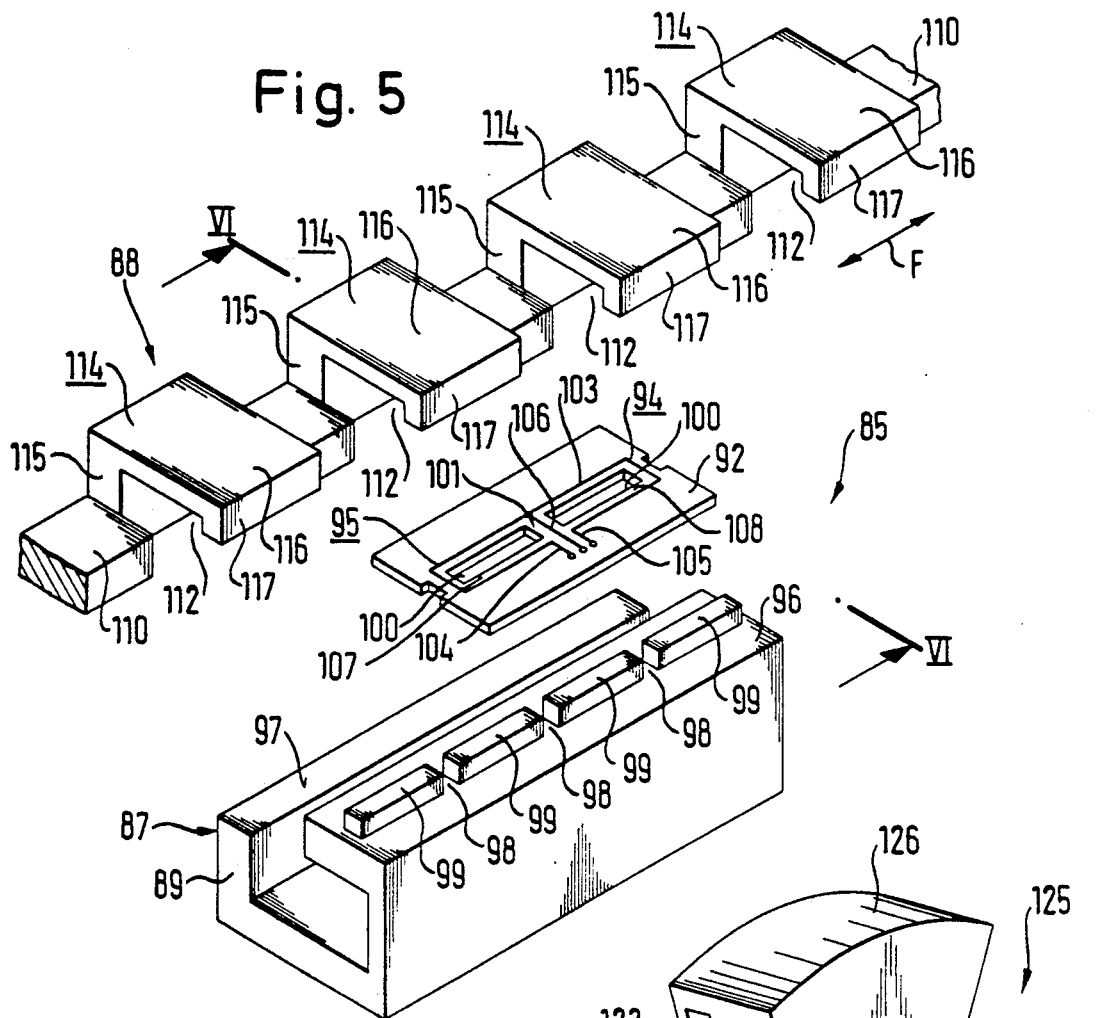
FIG. 5 is an explode view of a linear indicator in which the yoke moves relative to the core and the coil arrangement which is fixedly connected thereto.
Figure 6:
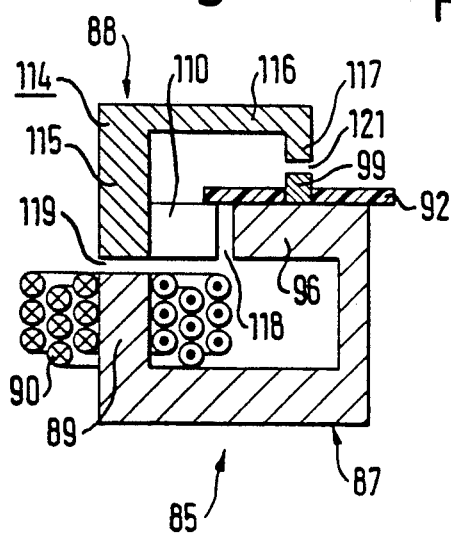
FIG. 6 is a view in section taken along line VI—VI through the assembled linear indicator shown in FIG. 5.

The embodiment shown in FIGS. 5 and 6 is a linear indicator or sensor 85 which is of a similar construction to the rotary indicator or sensor shown in FIGS. 1 and 2. It includes a flux guide means of ferromagnetic material comprising a core 87 and a yoke 88, as well as an exciter coil 90 (which is omitted in FIG. 5) wound around a limb 89 of the core, and a measurement coil arrangement, with two measurement coils 94 and 95, which is provided on one side of a carrier plate member 92 in the form of a printed circuit.

The core 87 is in the form of an elongate rectangular hollow parallelepiped of which the upward wall 96 in FIGS. 5 and 6 is approximately half cut-away, so that the side wall of the hollow parallelepiped, which is at the left in FIGS. 5 and 6, projects upwardly in the form of the free limb 89. The upper free end face 97 of the limb 89 is somewhat lower than the inside surface of the remaining part of the upper wall 96.

On its outside, the upper wall 96 has a rib which projects upwardly in the Figures and which extends parallel to the longitudinal axis of the core 87 almost over the entire length thereof and is of an approximately square cross-section. The rib is interrupted by three transversely extending openings 98 which extend as far as the surface of the wall 96 and thus subdivide the rib into four rib portions 99 of approximately the same length.

The rectangular carrier plate member 92 has two elongate rectangular opening 100 which pass therethrough and which are aligned with each other in the longitudinal direction and which are separated from each other by a web portion 101. The arrangement and dimensions of the openings 100 are such that the carrier plate member 92 can be fitted on the top side of the core 87 in such a way that the two central rib portions 99, 99 extend through the two openings 100, 100, while the web portion 101 passes through the middle one of the three openings 98.

The two measurement coils have a rectangular, elongate conductor 103 which almost completely surrounds the two openings 100 parallel to the edges thereof. It is only on one side that the conductor 103 is interrupted in the region of the web portion 101 and its two free ends are connected to the output terminals 104, 105 which extend outwardly parallel to each other and perpendicularly to the longitudinal direction of the conductor 103. From the opposite side of the conductor 103, a connecting conductor 106 extends over the web portion 101 between the output terminals 104, 105 and parallel to them. The conductor 106 forms the common edge of the surface regions 107, 108 which are enclosed by the two measurement coils 94, 95.

In this embodiment the yoke 88 is in the form of a bar which includes an elongate flat plate 110 in which openings 112 are provided at regular intervals. In the region of each of the openings 112, a raised battlement-like portion 114 which projects upwardly in FIGS. 5 and 6 projects above the flat plate 110.

The thickness of the flat plate 110 is equal to the thickness of the remaining part of the upper wall 96 of the core 87, and its width, transversely to the longitudinal direction, is somewhat less than the width of the cut-away part of the upper wall 96. The rectangular openings 112 extend from one longitudinal edge of the flat plate 110 into same and are of such a depth that the remaining part of the flat plate is of the same thickness as the free limb 89 of the core 87. The length of the openings 112 is equal to the length of each of the four rib portions 99. The parts of the flat plate 110, which remain between the openings 112, are also of that length.

The raised battlement-like portions 114 which project upwardly in FIGS. 5 and 6 above the flat plate 110 are of a substantially L-shaped cross-section with a vertically upwardly projecting limb 115 which is so arranged that its side surface which is at the left in the Figures is aligned with the corresponding side surface of the flat plate 110. At its upward end in the Figures, the vertical limb 115 joins a horizontal limb 116 which faces in the same direction as the parts of the flat plate 110 which have remained between the openings 112. The horizontal limb 116 extends substantially parallel to the remaining parts of the flat plate 110. At its edge which is at the right in the Figures, each of the horizontal limbs 116 has a forwardly facing rib 117 which extends over the entire length of the portion 114 and which is therefore as long as each of the four rib portions 99 of the core 87.

In the assembled condition, the yoke 88 is so arranged that the flat plate 110 approximately occupies the place of the cut-away part of the upper wall 96 of the core 87, with the horizontal limbs 116 being directed towards the remaining part of the upper wall 96 of the core 87. The side, which is shown at the right in the Figures, of the flat plate 110 of the yoke 88 is separated from the remaining part of the wall 96 by gaps 118, and from the end face 97 of the limb 89 of the core 87 by a gap 119. In this case also the gaps 118 and the gap 119 are in actual fact substantially smaller than shown in FIG. 6, for the sake of clarity of the drawing.

In the region of the openings 112 on the other hand the spacing between the yoke 88 and the remaining part of the upper wall 96 is very great in comparison with the gaps 118 so that here only an extremely weak leakage flux crosses over, by virtue of the correspondingly greater level of reluctance.

The width with which the horizontal limbs 116 of the portions 114 project away from the vertical limbs 115 thereof is such that the free end faces of the ribs 117, which in the assembled condition face towards the core 87, are disposed at a small spacing from and in opposite relation to the end faces, which are upward in FIGS. 5 and 6, of the rib portions 99. The gaps 121 which are formed here are also smaller than is shown in FIG. 6.

In this case also, the above-described configuration provides the magnetic flux generated by the exciter coil with two different kinds of annularly closed paths, wherein there are a plurality of paths of one and the same respective kind.

The first kind of paths leads from the limb 89 across the gap 119 into the upwardly directed limb 115, by way of the vertical limb 116, the downwardly facing rib 117 and across the gap 121 into one or two rib portions 99, by way of the remaining part of the upper wall 96 and by way of the side wall which is at the right in the Figures, and the bottom of the hollow parallelepiped forming the core 87, back to the limb 89. The magnetic flux passing through that measurement path therefore passes through the measurement coils 94, 95 disposed in the region of the gaps 191, in a manner which is dependent on position, and thus produces the measurement signals which can be taken off at the outputs of the two measurement coils and the difference in which is representative of the instantaneous position of the yoke 88 relative to the core 87 and also has a linearly rising and falling triangular curve configuration.

The second kind of annularly closed paths goes from the limb 89 by way of the gap 119 into the flat plate 110 and by way of the gaps 118 directly into the remaining part of the upper wall 96 from which it goes back to the limb 89 in the same manner as was described above in relation to the first kind of paths. Therefore the magnetic flux which passes along those compensating paths always remains beneath the plane of the measurement coils 94, 95 and cannot in any way influence or falsify the measurement result. It symmetrically halves the total flux in order to eliminate further interference values.

When the yoke 88 is displaced relative to the core 87 in the direction indicated by the double-headed arrow F, the transit surfaces defined by the lower ends of the ribs 117 are also displaced over the surface elements 107, 108 enclosed by the measurement coils 94, 95, so that the magnetic flux passing through the measurement coils alters.

The two outer rib portions 99 serve to provide symmetrical and defined conditions at the ends, which are at the front and at the rear respectively in the longitudinal direction, of the two measurement coils 94 and 95. The conductor portions of the measurement coils 94, 95, which extend at those ends and which like the connection conductor 106 also extend through the openings 99, may be completely or substantially embedded in ferromagnetic material, like also the conductor 106, as has already been described above.

Figure 7:
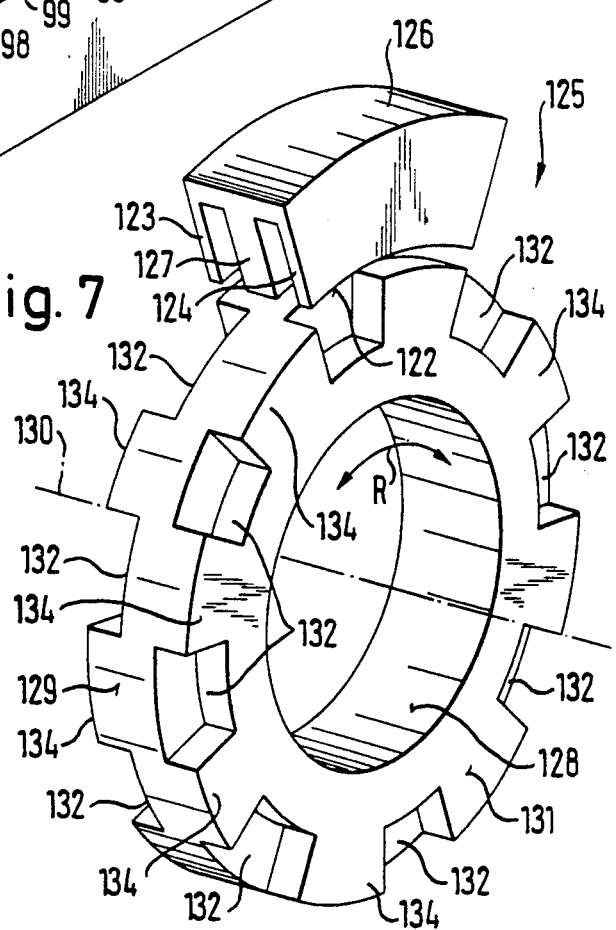
FIG. 7 shows a rotary indicator with movable yoke, in which a small, periodically recurring angular range is measuringly detected and resolved, in particular for use in motor vehicle brake anti-locking systems.

The embodiment of a rotary indicator or sensor 125 which is shown in FIG. 7 is suitable for accurate measurement detection of a comparatively small angular range, for example 45°, which, in a full 360° rotary movement, is covered a repeated number of times (in this case eight times). For that purpose, the rotary indicator 125 has a core 126 which is of E-shaped cross-section and around the central limb 127 of which is wound the exciter coil (not shown in FIG. 7). Provided at the end face 122 of one of the two outer limbs 123, 124 of the E-shape is a measurement coil arrangement (also not shown in FIG. 7) which substantially corresponds to the measurement coil arrangement shown in FIG. 5, that is to say, it also comprises two measurement coils which are formed by substantially rectangular conductors and which are arranged one behind the other in the longitudinal direction of the core 126 and through which there can also pass rib portions provided at the end of the respective limb 123 or 124 of the E-shape of the core 126. The main difference in relation to the measurement coil arrangement shown in FIG. 5 is that the carrier plate member is not flat but is curved in the form of a circular arc in the longitudinal direction, like the end faces of the limbs 123, 124, 127 of the E-shape of the core 126.

In this case, the yoke 128 is in the form of a wheel which is mounted rotatably in the direction indicated by the double-headed arrow R about an axis 130 which is shown by a dash-dotted line. The core 126 is arranged at a small spacing relative to the peripheral surface 129 of the yoke 128 in such a way that its longitudinal direction extends in the peripheral direction, that is to say its E-shaped cross-section extends in the direction of the axis 130. The length of the core 126 in the peripheral direction and the curvature of the end faces, which are towards the yoke 1287, of the limbs 123, 124 and 127 of the E-shape are so selected that the core 126 covers approximately an angular region of 45° which in this case is to involve measuring resolution. Openings 132 are formed into the yoke 128 from both faces 131 thereof. The openings 132 extend alternately into the two end faces 131, starting from the peripheral surface 129. Mutually adjacent openings 132 which are disposed on the same side are separated from each other by a respective remaining battlement-like portion 134. In the peripheral direction, the openings 132 and the battlement-like portions 134 are of the same length which is so selected that an opening 132 and a battlement-like portion 134 cover the angle to be monitored, which in this case is 45°.

The openings 132 in one face 131 are arranged in displaced relationship relative to the openings 132 in the other face 131, in such a way that, as viewed in the axial direction, an opening 132 and a battlement-like portion 134 are always opposite each other. The depth of the openings 132 in the axial direction is approximately twice as great as the cross-sectional width of the two outer limbs 123, 124 of the E-shape of the core 126. The axial width of the yoke 128 is so selected that a continuous web portion remains between the openings 132 which are formed in the yoke 128 from both sides; the continuous web portion is of approximately the same width as the central limb 127 of the E-shape of the core 126, which is approximately four times the width of the two outer limbs 123, 124 of the E-shape.

In this embodiment also, the magnetic flux generated by the exciter coil is offered two annularly closed paths of which one goes from the central limb 127 of the E-shape by way of the transverse web portion thereof into one outer limb 124 of the E-shape, from there by way of the air gap between the core 126 and the wheel-like yoke 128 into the end faces, which are opposite to the core 126, of at least one and generally two battlement-like portions 134, and from them by way of the middle region of the peripheral surface 129 back into the central limb 127 of the E-shape. The other path extends in the same manner through the other outer limb 123 of the E-shape. In this case also it is in principle possible to provide in the gap between the end faces of the two outer limbs of the E-shape, a respective measurement coil arrangement, each of which has two surface elements, so that in total two difference signals can be formed and combined together to amplify the output signal amplitude. In accordance with the invention however it is totally adequate to provide a measurement coil arrangement only in one of the two paths described above, with the other path being used purely as a compensating path.

If, in this embodiment also, the measurement coils are of the configuration as was described above with reference to FIGS. 5 and 6, that again gives a linearly rising and linearly falling triangular characteristic which the arrangement follows once in its entirety, when the yoke 128 rotates through 45°.

Figure 8:
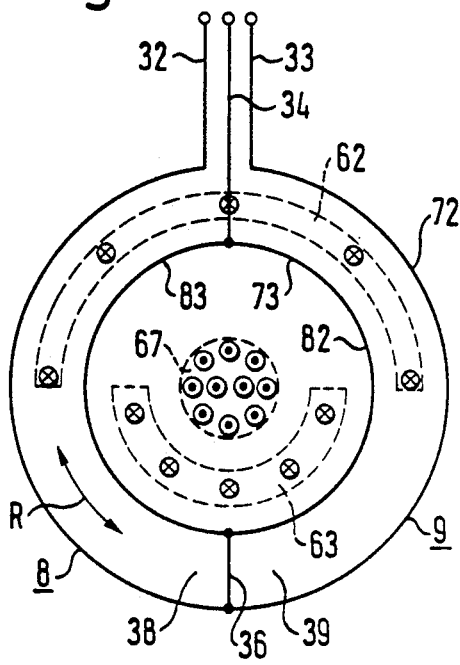
FIG. 8 shows a measurement coil arrangement for a rotary indicator with an inwardly disposed closed conductor and outwardly extended output terminals.
Figure 9:
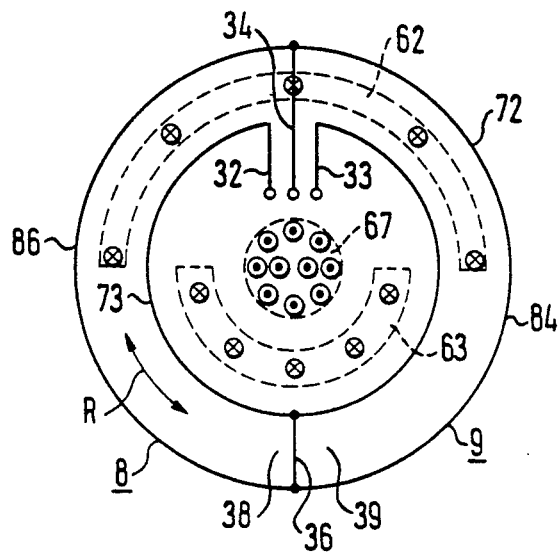
FIG. 9 shows a measurement coil arrangement for a rotary indicator with an outwardly disposed closed conductor and inwardly extended output terminals.
Figure 10:
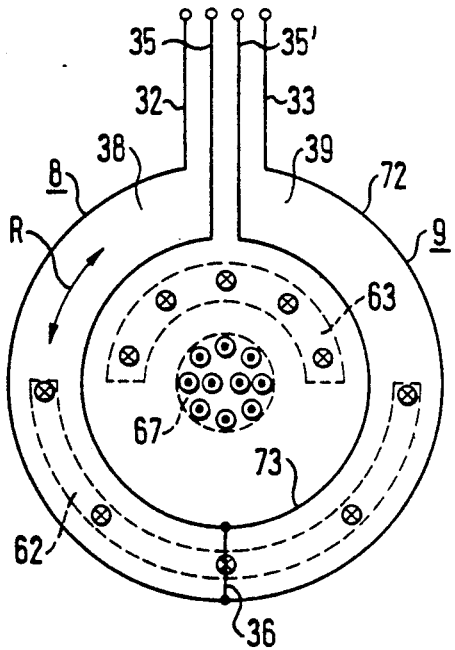
FIG. 10 shows a measurement coil arrangement for a rotary indicator with two surface elements which have a common edge conductor and whose output signals are tapped off by way of four output terminals.

FIGS. 8 through 10 show measurement coil arrangements which are suitable for rotary indicators or sensors for ascertaining and resolving a rotary angle of almost 180°. On the other hand, the measurement coil arrangement shown in FIG. 11 permits measurement of angles of up to 360° and more.

The measurement coil arrangements shown in FIGS. 8 through 10 each comprise two measurement coils 8 and 9, each of which comprises a single turn which is such that the surface element 38 or 39 which is enclosed by the respective measurement coil is substantially in the form of half a circular ring. The two half rings are so arranged that they supplement each other to provide a closed circular ring.

In addition, broken lines in FIGS. 8 through 10 symbolically represent the surface regions through which the substantially homogeneous magnetic flux passes when the respective measurement coil arrangements are used in conjunction with a flux guide means as was described with reference to FIGS. 3 and 4. They are the end face 67 of the projection 65 and the end faces 63 of the semi-cylindrical wall 59 (see FIG. 3) and the end face 62 of the semi-cylindrical wall 58.

The magnetic flux lines which pass through the above-indicated end faces 62, 63 and 67 are symbolically illustrated, wherein FIGS. 8 through 10 show a moment in time at which the magnetic flux goes through the end face 67 towards the person looking at the drawings and through the end faces 62, 63 away from that person; in that respect, as was described with reference to FIGS. 3 and 4, the respective change in direction is effected by means of the semicircular end walls 61, 62 of the core shells 51.

The flux guide means formed by the core shells 51, 51 is rotatable in the direction indicated by the double-headed arrow R, that is to say in the peripheral direction, relative to each of the measurement coil arrangements shown in FIGS. 8 through 10. In that situation, the end faces 62, 63 are displaced in the above-mentioned peripheral direction while the end face 67 remains stationary.

It will be seen that the dimensions of the surface elements 38, 39 enclosed by the measurement coils 8, 9 perpendicularly to the direction of movement, that is to say in the radial direction in FIGS. 8 through 10, are substantially larger than the corresponding dimensions of the end faces 62. The latter are so positioned that they lie in the radial direction approximately at the center of the surface elements 38, 39 and thus, relative to the outer and inner conductors 72, 73 which respectively define those surface elements, they are at such a large spacing that almost all field non-homogeneities which occur at the outer and inner peripheral edges of the transit surfaces defined by the end faces 62 always lie within the surface elements 38, 39. Accordingly, slight eccentricity movements, as can occur in the case of a 'normal' mounting configuration, have little influence on the measurement result.

In the direction of movement, that is to say in the peripheral direction, the end faces 62 are of practically the same length as the surface elements 38, 39, that is to say they each form a respective half-circular ring.

The size and shape of the end faces 62 on the one hand and the two surface elements 38, 39, as well as the mutual positioning of the latter, are matched to each other in such a way that, when the rotary movement to be monitored occurs, in the direction of the respective double-headed arrow R, the end face 62 is displaced relative to the surface elements 38, 39 in such a way that the magnetic flux through one of the two surface elements 38, 39 increases precisely to the degree that the magnetic flux through the respective other surface element decreases, and vice-versa. In that way, induced in the measurement coils 8 and 9 are two voltages, the difference in which reproduces the position of one of the two bodies to be monitored, with respect to the other.

It is important in that respect that the two mutually adjacent surface elements 38, 39 have at least one common edge portion over which the transit surface defined by the end face 62 can move, by virtue of the movement to be monitored. In the case of the arrangements shown in FIGS. 8 through 10, that is the edge portion formed by the connecting conductor 36 which extends in the radial direction between the inner conductor 73 and the outer conductor 72. A second edge portion of that kind is defined in the embodiments shown in FIGS. 8 and 9 together by the respective connecting conductor 34 which is in diametrally opposite relationship to the connecting conductor 36 and which also extends in the radial direction.

In both embodiments shown in FIGS. 8 and 9, two conductor portions 82, 83 and 84, 86 respectively, of which one defines the surface element 38 and the other defines the surface element 39 in each case along an edge which extends substantially parallel to the direction of displacement of the end face 62 relative to the respective surface element 38, 39, that is to say in this case along the inner circular periphery (FIG. 8) or the outer circular periphery (FIG. 9), are connected together at their two ends in such a way that they form an annularly closed conductor 82, 83 and 84, 86 respectively. The annularly closed conductors can be produced for example from a material which has a somewhat lower degree of conductivity than the copper conductors which are normally used, or they can be so thin that their resistance is sufficiently high in order not excessively to load the signal source which feeds the exciter coil (not shown), and to limit to a harmless level the current which flows in the closed conductor 82, 83 and 84, 86 respectively.

The closed conductor 82, 83 (FIG. 8) or 84, 86 (FIG. 9) respectively is connected to the output terminals which go to the evaluation electronic system, by way of the above-mentioned, radially extending connecting conductor 34.

The respective other conductor 72 or 73 respectively which delimits the two surface elements 38, 39 at the outer circular periphery (FIG. 8) or the inner circular periphery (FIG. 9) respectively is interrupted at the location which is in diametrally opposite relationship to the connecting conductor 36, and the resulting free ends are connected to the corresponding output terminals by way of connecting conductors 32, 33 which extend at a small spacing in parallel to the connecting conductor 34 radially outwardly (FIG. 8) or radially inwardly (FIG. 9). Each of the measurement coil arrangements in FIGS. 8 and 9 therefore has three output terminals, between which two measurement signals can be taken off, wherein the output terminal which is connected to the central connecting conductor 34 serves as a common reference point. Those signals are rectified and the difference thereof serves as a measurement in respect of the instantaneous position occupied by the transit surface defined by the end face 62, with respect to the two surface elements 38, 39.

By virtue of the different design configuration of the measurement coil arrangements shown in FIGS. 8 and 9, those difference signals have slightly different properties: as can be seen from FIG. 8, the inner closed conductor 82, 83 encloses all the magnetic flux which within the end face 67 passes upwardly through the plane of the drawing whereas, of the magnetic flux which passes through the plane of the drawing in the reverse direction, it encloses only the part which is within the end face 63. As a result of that, an additional voltage is added to each of the two voltages which can be taken off between the output terminals connected to the connecting conductors 32, 34 and 33, 34 respectively. Those two additional voltages are admittedly dependent on position but they are always of equal magnitude. As long as only the difference between those output signals is used in that way as the signal which is representative of the instantaneous position, as mentioned above, those two additional voltages disappear. In many cases however it is necessary to use not just the difference between the two output signals but the quotient of the difference and the sum of those two output signals as the signal which is representative of the instantaneous position, in order to eliminate possible variations in excitation. However the additional voltages no longer cancel each other out of the sum of the two output signals. Their most important effect is zero point displacement of the output signal. Furthermore however the additive additional voltages are also temperature-dependent.

In order to minimise that interference effect therefore the arrangement shown in FIG. 9 is to be preferred, in which the closed conductor 84, 86 encloses all magnetic flux lines which extend perpendicularly to the plane of the drawing from below upwardly and all magnetic flux lines which extend perpendicularly to the plane of the drawing from above downwardly, so that the resulting enclosed magnetic flux is almost equal to zero. Admittedly, in this case also, the different radial spacings of the end face 62 on the one hand and the end face 63 on the other hand from the annularly closed conductor 72 mean that a voltage is induced in the conductor 72 in accordance with Biot-Savart's law, and that voltage is additively impressed on the two output signals. In the embodiment shown in FIG. 9 however those additional voltages are considerably smaller than in the case of the embodiment shown in FIG. 8, so that their temperature-dependency has a substantially smaller influence on the measurement result. The embodiment shown in FIG. 9 will therefore be preferred whenever it is possible for the evaluation electronic system to be disposed within the inner conductor 73 of the measurement coil arrangement. Otherwise, outwardly extending wires which are connected to the inwardly disposed output terminals must be carefully twisted together so that they do not enclose any surface regions through which the magnetic flux lines can pass.

So that the connecting conductor 34, in accordance with the invention, is also made into an ideal edge conductor which separates the two surface elements 38, 39 from each other in such a way that it belongs to both surface elements, in a departure from the configuration shown in FIGS. 8 and 9, it can be widened on the side of the terminals, that is to say in FIG. 8 radially outside the region over which the transit surface passes and in FIG. 9 radially within that region, in such a way that it covers the entire space between the connecting conductors 32, 33. If the measurement coil arrangements in FIGS. 8 and 9 are produced in the form of printed circuits, that admittedly requires a change in plane on the printed circuit board or plate member, but there is sufficient space available for that purpose.

Under the above-indicated assumptions, those two embodiments are suitable for following and measuring rotary movements which can involve an angle of less than 180°. It is particularly advantageous in this connection that, from each of the two outer connecting conductors 32 and 33 respectively, there is a continuous conductor path to the central connecting conductor 34, in such a way that each of the electrical signals which can be taken off at those connecting conductors is produced by integration in relation to the magnetic fluxes which pass through the surface enclosed by that conductor path.

In FIG. 8, in regard to the measurement coil 8, the above-mentioned conductor paths extends from the connecting conductor 32 by way of the left-hand semicircular arc of the outer conductor 72, the connecting conductor 36 and the right-hand semicircular arc 82 of the inner conductor 73 to the connecting conductor 34, while in regard to the measurement coil 9, the conductor paths go from the connecting conductor 33 by way of the right-hand semicircular arc of the outer conductor 72, the connecting conductor 36 and the left-hand semicircular arc 83 of the inner conductor 73 to the connecting conductor 34. Both paths enclose the major part of the magnetic flux which occurs in the arrangement (more specifically, always the entire fluxes through the end faces 63 and 67 and varying components of the flux through the end face 62) and thus essentially also all relevant interference fluxes. As, to produce the measurement signal, the difference is formed between the voltages which can be taken off between the terminals 32, 34 and 33, 34, those interference influences again disappear. Here therefore an important aspect is that all interference phenomena are as far as possible involved in the same fashion in each of the two signal portions, so that very substantial elimination occurs in the subsequent subtraction operation.

A corresponding consideration also applies in regard to the embodiment of FIG. 9 in which the integration paths for the measurement coil 9 go from the connecting conductor 32 by way of the left-hand semicircular arc of the inner conductor 73, the connecting conductor 36 and the right-hand semicircular arc 84 of the outer conductor 72 to the connecting conductor 34, and, for the measurement coil 8, from the connecting conductor 33 by way of the right-hand semicircular arc of the inner conductor 73, the connecting conductor 36 and the left-hand semicircular arc 86 of the outer conductor 72 to the connecting conductor 34.

That is not possible with the embodiment shown in FIG. 10, when it is constructed precisely in the illustrated fashion. More specifically, this example differs from the embodiments described above, in that both conductors 72, 73, at the side which is opposite to the connecting conductor 36, have an interruption so that here there are four output conductors 32, 33, 35, 35' which lead to four output terminals. The advantage of this arrangement is that two signals on which no temperature-dependent additional voltages are impressed can be taken off between the above-mentioned output terminals which of course may not be short-circuited to each other. If this embodiment is to be modified in such a way that it is also suitable for measuring an angle of greater than 360° C., then for example the two connecting conductors 35, 35' can be disposed in two different planes in such a way that, in the regions in which they are exposed to a magnetic flux which passes perpendicularly through the plane of the drawing, the conductors are disposed in succession as viewed in the direction of the magnetic flux, and are coincident with each other. In the case of a printed circuit, that can again be achieved by using both sides of the circuit board member. Outside the region through which a magnetic flux passes, the two connecting conductors 35, 35' can then be moved apart in such a way that their connecting contacts conveniently have space one beside the other.

Figure 11:
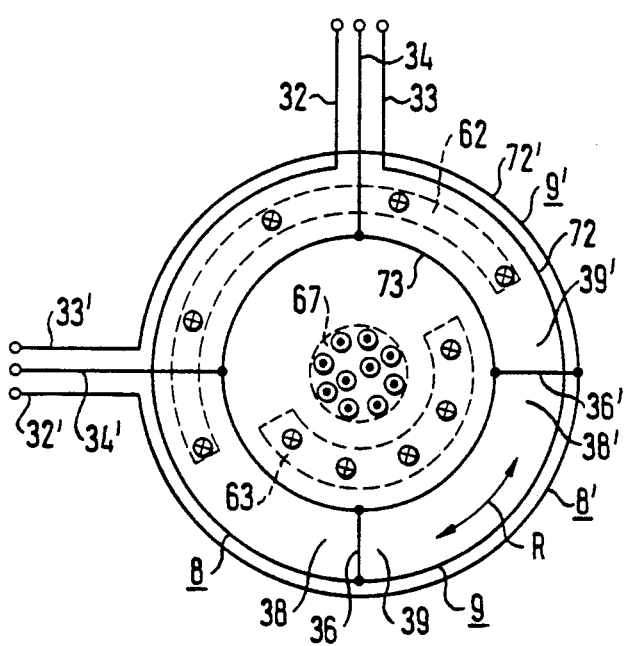
FIG. 11 shows a measurement coil arrangement for a rotary indicator comprising two measurement coil groups which are displaced through 90° relative to each other and which have a common inner closed conductor.

A further possible way of avoiding the above-described difficulties with the additive additional voltages, provides, as shown in FIG. 11, using two measurement coil systems as shown in FIG. 8 and arranging them in a position of being turned through 90° relative to each other. Those two measurement coil systems have in common the inner, annularly closed conductor 73. By way of two connecting conductors 36, 36' which are arranged in displaced relationship relative to each other through an angle of 90°, the conductor 73 is connected to the two outer conductors 72, 72' which in actual fact are of the same diameter and which for example can be arranged on the two flat sides of a double-sided carrier board member for printed circuits. The through-contacting means between the two sides of the board member, which are required in that arrangement, are not shown in FIG. 11 for the sake of simplicity. It is to be assumed however that all mutually crossing conductors are insulated from each other at the respective location, if an electrically conductive contact is not indicated by a dot-shaped thickening. Each of the two outer conductors 72, 72' is interrupted at the side which is diametrally oppositely disposed to the associated connecting conductor 36, 36', and there connected to two connecting conductors 32, 33 and 32', 33' respectively which extend outwardly at a spacing, as was described above with reference to FIG. 8. Extending radially outwardly between the connecting conductors 32, 33 and 32', 33' is a respective connecting conductor 34, 34' coming from the inner, completely closed conductor 73. Each of the two measurement coil systems therefore has three output terminals at which, as was described above with reference to FIG. 8, it is possible to take off two signals, the difference in which is representative of the instantaneous position of the transit surface 64 with respect to the surface elements 38, 39 and 38', 39' respectively which are enclosed by the measurement coils 8, 9 and 8', 9' respectively. Those output voltages are of different values which are displaced relative to each other with respect to the geometrical rotary movement through 90°. That gives two advantages:

On the one hand, two signal differences, namely the difference between the output signals at the terminals 32, 34 and 33, 34 and between the terminals 32', 34' and 33', 34' are formed and continuously assessed as a signal which is representative of the instantaneous position. The above-described, additively impressed additional voltages disappear due to the difference-forming operation. Variations due to excitation and temperature effects can be eliminated by the formation of a quotient from one of those differences and a measurement value which includes those influences and which is derived for example from the exciter current, so that those interference phenomena no longer play any part.

On the other hand, because of the arrangement according to the invention, the signal difference at the output terminals 32, 33, 34 is of a particularly linear configuration precisely whenever the signal difference at the terminals 32', 33', 34' approaches the tips of the triangles, which are no longer ideally linear, and vice-versa. Accordingly, a further improvement in the desired optimum approximation of the actual characteristic configuration to the ideal characteristic configuration which is predetermined by the structure involved can be achieved by virtue of the fact that, as mentioned, the output signals are combined together with a different weighting, in which case the signal which is actually to be evaluated always involves to a particularly substantial extent the signal which instantaneously passes through its ideally linear region, while the respective other signal is correspondingly more weakly weighted.

In this case also, as was described above, it is possible for the respective central connecting conductor 34, 34' to be passed to the side of the plate or board member which is opposite to the connecting conductors 32, 33 or 32', 33' respectively, where it can be made so broad that it completely covers over the spacer strip between the two associated other connecting conductors.

Another possibility which is not shown in the drawings, of providing a rotary indicator or sensor with the maximum degree of geometrical symmetry in respect of the measurement and compensating paths, is that of so modifying the embodiment shown in FIGS. 3 and 4 that the two semi-cylindrical walls 58, 59 are of the same internal or external radius, but one of them is thicker in the radial direction than the other, so that it has a wider end face 63 or 63 respectively. The measurement coils are then so designed and arranged that parts of the wide end faces but not parts of the narrow end faces can pass over the coils.

It will be appreciated that the above-described constructions have been set forth solely by way of example and illustration of the principles of the present invention and that various modifications may be made therein without thereby departing from the spirit and scope of the present invention.

It will be further appreciated that the reference numerals contained in the appended claims serve for ease of interpretation thereof and are not intended to have a restrictive effect.

What is claimed is:

1. An inductive position indicator (1, 50, 85, 125) for monitoring the positions occupied by first and second mutually movable bodies with respect to each other, comprising:

at least one exciter coil (6, 53, 90), means for feeding the exciter coil with alternating current to generate a magnetic flux, a measurement coil arrangement (8, 9; 54–57, 94, 95) having at least one measurement coil turn enclosing at least one surface element (38, 39; 38', 39'; 107, 108), and a flux guide means (3, 4; 51, 52; 87, 88; 126, 128) of ferromagnetic material, which provides for the magnetic flux generated by the exciter coil (6, 53, 90) a closed measurement path which includes at least one gap (47, 70, 121) defined by mutually oppositely disposed wall surfaces which concentrate the magnetic flux, that crosses over between them, in a spatial region which intersects the surface of said at least one surface element (38, 39; 38', 39'; 107, 108) at a transit surface (64) which is displaceable, in dependence on the movement of one of the bodies relative to the other, with respect to said at least one surface element, the size and shape of the transit surface and said at least one surface element being so matched to each other that the magnetic flux through said at least one surface element changes by virtue of the displacement of said transit surface (64) so that the measurement coil arrangement supplies an electrical output signal which is indicative of the position of one of the bodies relative to the other; wherein said flux guide means (3, 4; 51, 52; 87, 88; 126, 128) also provides for the magnetic flux generated by the exciter coil (6; 53; 90) a closed compensating path for carrying the magnetic flux passing therethrough, past said at least one surface element (38, 39; 38', 39'; 107, 108) through which the magnetic flux of the measurement path can pass, and wherein said measurement path and said compensating path are so arranged that the magnetic flux passing through each of the paths is independent of a momentary position of one of the bodies relative to the other.

2. A position indicator as set forth in claim 1 wherein said measurement and compensating paths are of a symmetrical configuration.

3. A position indicator as set forth in claim 1 wherein said measurement and compensating paths are at least approximately of the same geometrical configuration.

4. A position indicator as set forth in claim 1 wherein said measurement and compensating paths have the same magnetic flux density.

5. A position indicator as set forth in claim 1 wherein said measurement and compensating paths are of at least approximately the same reluctance.

6. A position indicator as set forth in claim 1 wherein said at least one compensating path includes at least one gap (43; 71; 118).

7. A position indicator as set forth in claim 1 wherein said compensating path is so arranged relative to the measurement path that it produces a defined field distribution at least at edges (48, 49; 78, 79) of said gap (47; 70; 121) in the measurement path, which, upon a movement of one of the bodies relative to the other, can at least move towards an edge line (34, 36; 34', 36') of the at least one surface element (38, 39; 38', 39'; 107, 108).

8. A position indicator as set forth in claim 1 wherein said compensating path is so arranged relative to the measurement path that it produces a defined field distribution at least at edges (48, 49; 78, 79) of said gap (47; 70; 121) in the measurement path, which, upon a movement of one of the bodies relative to the other, can move over an edge line (34, 36; 34', 36') of the at least one surface element (38, 39; 38', 39'; 107, 108).

9. A position indicator as set forth in claim 6 wherein the mutually oppositely disposed wall surfaces of said gap (71) in the compensating path concentrate the magnetic flux, which crosses over between them, in a spatial region which intersects the surface of at least one further surface element, which is enclosed by a measurement coil turn, at a transit surface which is displaceable in dependence on the movement of one of the bodies relative to the other, with respect to said at least one further surface element, the size and shape of the transit surface and said at least one further surface element being so matched to each other that the magnetic flux which passes through said at least one further surface element changes by virtue of said displacement, and including means for combining the signals outputted by the at least two measurement coil turns (56, 57) thereby to increase the measurement signal amplitude.

10. A position indicator as set forth in claim 6, wherein the flux guide means (3, 4; 87, 88) comprises a core (3; 87) partially enclosed by the exciter coil (6; 90), and a yoke (4; 88), and wherein the exciter coil (6; 90), the core (3; 87) and the measurement coil arrangement (8, 9; 94, 95) are connectable to one of the mutually movable bodies immovably at least in the direction of the movement to be monitored, and the yoke (4; 88) is connectable to the other of the bodies immovably at least in the direction of said movement.

11. A position indicator as set forth in claim 1, wherein the flux guide means (51, 51) includes a projection (65) which is enclosed by the exciter coil (53), and a return body (60, 61, 58, 59) to which the projection (65) is fixedly connected and which defines the at least two closed paths, and wherein the flux guide means (51) is connectable to one of the mutually movable bodies immovably at least in the direction of the movement to be monitored, and the measurement coil arrangement (54, 55, 56, 57) is connectable to the other of the bodies immovably at least in the direction of said movement.

12. A position indicator as set forth in claim 11 wherein the measurement coil arrangement (54, 55, 56, 57) is connectable to one of the mutually movable bodies, and wherein the exciter coil (53) is connectable, immovably at least in the direction of the movement to be monitored, to said one of the mutually movable bodies to which the measurement coil arrangement (54, 55, 56, 57) is also connected.

13. A position indicator as set forth in claim 1 wherein said at least one surface element (38, 39) of the measurement coil arrangement (8, 9) and said transit surface defined by the wall surfaces (62) of the gap (70) are of the same shape and are so arranged that their edge lines extend at least approximately parallel to each other.

14. A position indicator as set forth in claim 1 wherein said at least one surface element (38, 39) of the measurement coil arrangement (8, 9) is of larger dimensions than the transit surfaces (64), perpendicularly to the direction in which the transit surface (64) is displaced relative to the surface element (38, 49).

15. A position indicator as set forth in claim 1 wherein the measurement coil arrangement (8, 9) includes conductor portions (34, 36) which define a surface element (38, 39) and which are so arranged that, by virtue of the movement to be monitored, the transit surface (64) can approach them, said conductor portions (34, 36) extending perpendicularly to the direction of movement of the transit surface.

16. A position indicator as set forth in claim 1 wherein the measurement coil arrangement (8, 9) includes conductor portions (34, 36) which define a surface element (38, 39) and which are so arranged that, by virtue of the movement to be monitored, the transit surface (64) can move over them, said conductor portions (34, 36) extending perpendicularly to the direction of movement of the transit surface.

17. A position indicator as set forth in claim 1 wherein the measurement coil arrangement (8, 9) includes conductor portions (34, 36) which define a surface element and which are so arranged that, by virtue of the movement to be monitored, the transit surface can approach them, said conductor portions being completely surrounded by ferromagnetic material.

18. A position indicator as set forth in claim 1 wherein the measurement coil arrangement (8, 9) includes conductor portions (34, 36) which define a surface element and which are so arranged that, by virtue of the movement to be monitored, the transit surface can move over them, said conductor portions being completely surrounded by ferromagnetic material.

19. A position indicator as set forth in claim 1 including a body of ferromagnetic material in the gap in the region of which said at least one surface element (38, 39; 38', 39'; 107, 108) is disposed, said body being enclosed by the surface element and immovable relative to the measurement coil arrangement.

20. A position indicator as set forth in claim 1 wherein said measurement coil arrangement (8, 9) has at least two mutually adjacent surface elements (38, 39) which are each enclosed by at least one respective measurement coil turn and the surfaces of which are adapted to be variably covered by said transit surface, the size and shape of the transit surface and said at least two surface elements (38, 39) being so matched to each other and the mutual positions of the at least two surface elements (38, 39) being so selected, that by virtue of said displacement the magnetic flux through the one surface element (38, 39) increases when the magnetic flux through the other surface element (38, 39) decreases, and decreases when the magnetic flux through the other surface element (38, 39) increases, so that the measurement coil turns supply output signals whose difference is indicative of the position of one of said bodies relative to the other, said at least two surface elements (38, 39) having at least one common edge portion over which the transit surface is movable by virtue of the movement to be monitored.

21. An inductive position indicator as set forth in claim 20 wherein a common edge portion is formed by first and second conductor portions which, as viewed in the direction of the magnetic flux in the gap, are arranged in succession at a small spacing in such a way that they coincide with each other.

22. An inductive position indicator as set forth in claim 20 wherein a common edge portion is formed by a conductor portion (34, 36) which is common to the measurement coil turns which enclose the respective surface elements (38, 39).

23. An inductive position indicator as set forth in claim 20 wherein first and second conductor portions (82, 83; 84, 86) of which one (82; 84) defines the one surface element (38) and the other (83; 86) defines the other surface element (39) each along a respective edge which extends at least substantially parallel to the direction of displacement of the transit surface relative to the respective surface element (38, 39), have ends thereof connected to form an annularly closed conductor, and wherein said closed conductor has a defined electrical resistance.

24. An inductive position indicator in the form of a rotary indicator as set forth in claim 23 comprising first and second surface elements (38, 39) which are each substantially in the form of half a circular ring and so arranged that they supplement each other substantially to provide a full circular ring which is at least substantially concentric with respect to the axis of the movement to be monitored.

25. An inductive position indicator as set forth in claim 24 wherein first and second conductor portions (82, 83) which inwardly define the surface elements (38, 39) are connected together to form an annularly closed conductor, and a substantially radially extending first connecting conductor (34) is connected to said closed conductor for connection to an electronic evaluation means, wherein first and second conductor portions which outwardly define the surface elements (38, 39) are connected together at their ends which are in diametrally opposite relationship to the first connecting conductor (34) and, by way of a substantially radially extending conductor portion (36) forming a common edge portion of the two surface elements (38, 39), are connected to the conductor portions (82, 83) which inwardly define the surface elements (38, 39), while their other ends are separated from each other and are connected to second and third substantially radially extending connecting conductors (32, 33) respectively for connection to the electronic evaluation means, and wherein the first, second and third connecting conductors (32, 33, 34) extend at least substantially parallel to each other at the smallest possible spacings.

26. An inductive position indicator as set forth in claim 24 wherein first and second conductor portions (84, 86) which outwardly define the surface elements (38, 39) are connected together to form an annularly closed conductor (72) and a substantially radially extending first connecting conductor (34) is connected to the closed conductor for connection to an electronic evaluation means, wherein first and second conductor portions which inwardly define the surface elements (38, 39) are connected together at their ends which are diametrally opposite to the first connecting conductor (34), and, by way of a radially extending conductor portion (36) which forms a common edge portion of the two surface elements (38, 39), are connected to the conductor portions (84, 86) which outwardly define the surface elements (38, 39), while their other ends are separated from each other and are connected to second and third substantially radially extending connecting conductors (32, 33) respectively for connection to the electronic evaluation means, and wherein the first, second and third connecting conductors (32, 33, 34) extend at least substantially parallel to each other at the smallest possible spacings.

27. An inductive position indicator as set forth in claim 25 wherein in any position both the magnetic flux through the exciter coil and also the magnetic flux through the compensating path pass through the surface enclosed by the closed conductor (82, 83).

28. An inductive position indicator as set forth in claim 26 wherein in any position the magnetic flux through the exciter coil as well as the magnetic flux through the compensating path and the magnetic flux through the measurement path pass through the surface enclosed by the closed conductor (84, 86).

29. An inductive position indicator as set forth in claim 25 wherein the first connecting conductor (34) is of the width of the spacing between the second and third connecting conductor (32, 33) and is so arranged that, as viewed in the direction of the magnetic flux, it coincides with said spacing, being disposed in a second plane.

30. An inductive position indicator as set forth in claim 26 wherein the first connecting conductor (34) is of the width of the spacing between the second and third connecting conductors (32, 33) and is so arranged that, as viewed in the direction of the magnetic flux, it coincides with said spacing, being disposed in a second plane.

31. An inductive position indicator for monitoring positions occupied by first and second mutually movable bodies with respect to each other, comprising:
at least one exciter coil (6, 53, 90),
means for feeding the exciter coil with alternating current to generate a magnetic flux,
a measurement coil arrangement (8, 9; 54–57; 94, 95) having at least two measurement coil turns each enclosing respective mutually adjacent surface elements (38, 39), and
a flux guide means (3, 4; 51, 52; 87, 88; 126, 128) of ferromagnetic material, which provides for the magnetic flux generated by the exciter coil (6, 53, 90) a closed path which includes at least one gap defined by mutually oppositely disposed wall surfaces which concentrate the magnetic flux, that crosses over between them, in a spatial region which intersects the surfaces of said at least two surface elements at a transit surface which is displaceable, in dependence on the movement of one of the two bodies relative to the other, with respect to said at least two surface elements, the size and shape of the transit surface and said at least two surface elements being so matched to each other and the mutual positions of said at least two surface elements being so selected that by virtue of said displacement of said transit surface the magnetic flux through the one surface element increases when the magnetic flux through the other surface element decreases, and decreases when the magnetic flux through the other surface element increases, whereby the measurement coil turns supply electrical output signals whose difference is indicative of the position of one of the bodies relative to the other, said at least two surface elements (38, 39) having at least one common edge portion over which the transit surface is movable by virtue of the movement to be monitored.

32. An inductive position indicator as set forth in claim 31 wherein a common edge portion is formed by first and second conductor portions which, as viewed in the direction of the magnetic flux in the gap, are arranged in succession at a small spacing in such a way that they coincide with each other.

33. An inductive position indicator as set forth in claim 31 wherein a common edge portion is formed by a conductor portion (34, 36) which is common to the measurement coil turns which enclose the respective surface elements (38, 39).

34. An inductive position indicator as set forth in claim 31 wherein first and second conductor portions (82, 83; 84, 86) of which one (82; 84) defines the one surface element (38) and the other (83; 86) defines the other surface element (39) each along a respective edge which extends at least substantially parallel to the direction of displacement of the transit surface relative to the respective surface element (38, 39), have ends thereof connected to form an annularly closed conductor, and wherein said closed conductor has a defined electrical resistance.

35. An inductive position indicator in the form of a rotary indicator as set forth in claim 34 comprising first and second surface elements (38, 39) which are each substantially in the form of half a circular ring and so arranged that they supplement each other substantially to provide a full circular ring which is at least substantially concentric with respect to the axis of the movement to be monitored.

36. An inductive position indicator as set forth in claim 35 wherein first and second conductor portions (82, 83) which inwardly define the surface elements (38, 39) are connected together to form an annularly closed conductor, and a substantially radially extending first connecting conductor (34) is connected to said closed conductor for connection to an electronic evaluation means, wherein first and second conductor portions which outwardly define the surface elements (38, 39) are connected together at their ends which are in diametrally opposite relationship to the first connecting conductor (34) and, by way of a substantially radially extending conductor portion (36) forming a common edge portion of the two surface elements (38, 39), are connected to the conductor portions (82, 83) which inwardly define the surface elements (38, 39), while their other ends are separated from each other and are connected to second and third substantially radially extending connecting conductors (32, 33) respectively for connection to the electronic evaluation means, and wherein the first, second and third connecting conductors (32, 33, 34) extend at least substantially parallel to each other at the smallest possible spacings.

37. An inductive position indicator as set forth in claim 35 wherein first and second conductor portions (84, 86) which outwardly define the surface elements (38, 39) are connected together to form an annularly closed conductor (72) and a substantially radially extending first connecting conductor (34) is connected to the closed conductor for connection to an electronic evaluation means, wherein first and second conductor portions which inwardly define the surface elements (38, 39) are connected together at their ends which are diametrally opposite to the first connecting conductor (34), and, by way of a radially extending conductor portion (36) which forms a common edge portion of the two surface elements (38, 39), are connected to the conductor portions (84, 86) which outwardly define the surface elements (38, 39), while their other ends are separated from each other and are connected to second and third substantially radially extending connecting conductors (32, 33) respectively for connection to the electronic evaluation means, and wherein the first, second and third connecting conductors (32, 33, 34) extend at least substantially parallel to each other at the smallest possible spacings.

38. An inductive position indicator as set forth in claim 36 wherein in any position both the magnetic flux through the exciter coil and also the magnetic flux through the compensating path pass through the surface enclosed by the closed conductor (82, 83).

39. An inductive position indicator as set forth in claim 37 wherein in any position the magnetic flux through the exciter coil as well as the magnetic flux through the compensating path and the magnetic flux through the measurement path pass through the surface enclosed by the closed conductor (84, 86).

40. An inductive position indicator as set forth in claim 36 wherein the first connecting conductor (34) is of the width of the spacing between the second and third connecting conductors (32, 33) and is so arranged that, as viewed in the direction of the magnetic flux, it coincides with said spacing, being disposed in a second plane.

41. An inductive position indicator as set forth in claim 37 wherein the first connecting conductor (34) is of the width of the spacing between the second and third connecting conductors (32, 33) and is so arranged that, as viewed in the direction of the magnetic flux, it coincides with said spacing, being disposed in a second plane.

* * * * *